US012772145B2

(12) United States Patent
Huang et al.

(10) Patent No.: US 12,772,145 B2
(45) Date of Patent: Oct. 20, 2026

(54) RACH ENHANCEMENTS FOR RADAR COEXISTENCE

(71) Applicant: InterDigital Patent Holdings, Inc., Wilmington, DE (US)

(72) Inventors: Joe Huang, Montville, NJ (US); Sudhir Pattar, Mount Laurel, NJ (US); Philip Pietraski, Jericho, NY (US); Tariq Elkourdi, Belleville, NJ (US); Daniel Steinbach, Commack, NY (US); Jane Mack, Melville, NY (US); Phillip Leithead, King of Prussia, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 6 days.

(21) Appl. No.: 18/141,133

(22) Filed: Apr. 28, 2023

(65) Prior Publication Data

US 2023/0363006 A1 Nov. 9, 2023

Related U.S. Application Data

(60) Provisional application No. 63/336,665, filed on Apr. 29, 2022.

(51) Int. Cl.

*H04W 74/00* (2009.01)
*H04W 48/08* (2009.01)

(Continued)

(52) U.S. Cl.

CPC ....... *H04W 48/08* (2013.01); *H04W 74/0833* (2013.01); *H04W 74/0836* (2024.01); *H04W 74/0838* (2024.01)

(58) Field of Classification Search

CPC ............ H04W 74/0833; H04W 48/08; H04W 74/006; H04W 74/0836; H04W 74/0838; H04W 40/24

(Continued)

(56) References Cited

U.S. PATENT DOCUMENTS

2018/0324623 A1* 11/2018 Jung .................... H04W 24/10
2019/0174438 A1* 6/2019 Zhang .............. H04W 72/0453

(Continued)

FOREIGN PATENT DOCUMENTS

WO WO-2019195445 A1 * 10/2019 ........ H04W 74/0833
WO 2023/034146 3/2023
WO 2023/055934 4/2023

OTHER PUBLICATIONS

Dahlman et al., 5G NR The Next Generation Wireless Access Technology, Academic Press (2021).

(Continued)

*Primary Examiner* — Ayman A Abaza
*Assistant Examiner* — Tracy L Williams
(74) *Attorney, Agent, or Firm* — Volpe Koenig

(57) ABSTRACT

A wireless transmit receive unit (WTRU) and methods are disclosed for mitigating radar interference with transmission and reception of RACH preambles. According to a first aspect, one or more first RACH preambles are transmitted based on a first RACH configuration. The WTRU may receive an RAR with an indication that the first RACH configuration is unavailable. The WTRU may then retrieve a second RACH configuration information. The WTRU may then transmit one or more second RACH preambles based on the second RACH configuration and then completes a random access procedure based on the second RACH configuration.

16 Claims, 30 Drawing Sheets

(51) Int. Cl.

| | |
|---|---|
| ***H04W 74/06*** | (2009.01) |
| ***H04W 74/0833*** | (2024.01) |
| *H04W 74/0836* | (2024.01) |
| *H04W 74/0838* | (2024.01) |

(58) Field of Classification Search
USPC .......................................................... 370/329
See application file for complete search history.

(56) References Cited

U.S. PATENT DOCUMENTS

| | | | |
|---|---|---|---|
| 2020/0281026 A1* | 9/2020 | Yan ....................... | H04L 5/0053 |
| 2020/0314917 A1* | 10/2020 | Jeon ...................... | H04W 74/08 |
| 2021/0112603 A1* | 4/2021 | Xue .......................... | H04L 5/14 |
| 2021/0307078 A1* | 9/2021 | Singh ................ | H04W 74/0808 |
| 2021/0321460 A1* | 10/2021 | Taherzadeh Boroujeni ................ | H04L 43/16 |
| 2021/0392697 A1* | 12/2021 | Sakhnini ........... | H04W 74/0891 |
| 2022/0210844 A1* | 6/2022 | MolavianJazi ....... | H04L 5/0053 |
| 2024/0080888 A1* | 3/2024 | Golitschek Edler Von Elbwart ............ | H04W 74/0833 |
| 2024/0340897 A1* | 10/2024 | Takahashi ......... | H04W 72/0453 |

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHZ, IEEE Std 802.11ac-2013 (Dec. 11, 2013).
IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).
IEEE Standard for Information technology—Telecommunications and information exchange between systems - Local and metropolitan area networks—Specific requirements; Part 11: Wireless LAN Medium Access Control (MAC) and Physical Layer (PHY) Specifications, IEEE Std. 802.11-2020 (Dec. 3, 2020).
Third Generation Partnership Project, "Technical Specification Group Radio Access Network; NR; Physical channels and modulation (Release 17)," 3GPP TS 38.211 V17.4.0 (Dec. 2022).
Third Generation Partnership Project, "Technical Specification Group Radio Access Network; NR; Physical channels and modulation (Release 16)," 3GPP TS 38.211 V16.9.0 (Mar. 2022).
Third Generation Partnership Project, "Technical Specification Group Radio Access Network; NR; Physical channels and modulation (Release 17)," 3GPP TS 38.211 V17.1.0 (Dec. 2022).
Third Generation Partnership Project, "Technical Specification Group Radio Access Network; NR; Physical layer procedures for control (Release 17)," 3GPP TS 38.213 V17.1.0 (Mar. 2022).
Third Generation Partnership Project, "Technical Specification Group Radio Access Network; NR; Physical layer procedures for control (Release 17)," 3GPP TS 38.213 V17.5.0 (Mar. 2023).
Third Generation Partnership Project, "Technical Specification Group Radio Access Network; NR; Physical layer procedures for control (Release 16)," 3GPP TS 38.213 V16.9.0 (Mar. 2022).
Third Generation Partnership Project, "Technical Specification Group Radio Access Network; NR; Radio Resource Control (RRC) protocol specification (Release 16)," 3GPP TS 38.331 V16.7.0 (Dec. 2021).
Third Generation Partnership Project, "Technical Specification Group Radio Access Network; NR; Radio Resource Control (RRC) protocol specification (Release 17)," 3GPP TS 38.331 V17.4.0 (Mar. 2023).
Third Generation Partnership Project, "Technical Specification Group Radio Access Network; NR; Radio Resource Control (RRC) protocol specification (Release 17)," 3GPP TS 38.331 V17.0.0 (Mar. 2022).
Third Generation Partnership Project, "Technical Specification Group Radio Access Network; NR; Multiplexing and channel coding (Release 17)," 3GPP TS 38.212 V17.5.0 (Mar. 2023).
Third Generation Partnership Project, "Technical Specification Group Radio Access Network; NR; Multiplexing and channel coding (Release 17)," 3GPP TS 38.212 V17.1.0 (Mar. 2022).
Third Generation Partnership Project, "Technical Specification Group Radio Access Network; NR; Physical layer procedures for data (Release 17)," 3GPP TS 38.214 V17.5.0 (Mar. 2023).
Third Generation Partnership Project, "Technical Specification Group Radio Access Network; NR; Physical layer procedures for data (Release 17)," 3GPP TS 38.214 V17.1.0 (Mar. 2022).
Third Generation Partnership Project, "Technical Specification Group Radio Access Network; NR; User Equipment (UE) radio transmission and reception; Part 1: Range 1 Standalone (Release 17)," 3GPP TS 38.101-1 V17.5.0 (Mar. 2022).
Third Generation Partnership Project, "Technical Specification Group Radio Access Network; NR; User Equipment (UE) radio transmission and reception; Part 1: Range 1 Standalone (Release 18)," 3GPP TS 38.101-1 V18.1.0 (Mar. 2023).
Third Generation Partnership Project, "Technical Specification Group Radio Access Network; NR; User Equipment (UE) radio transmission and reception; Part 1: Range 1 Standalone (Release 17)," 3GPP TS 38.101-1 V17.9.0 (Mar. 2023).
Third Generation Partnership Project, "Technical Specification Group Radio Access Network; NR; User Equipment (UE) radio transmission and reception; Part 2: Range 2 Standalone (Release 17)," 3GPP TS 38.101-2 V17.5.0 (Mar. 2022).
Third Generation Partnership Project, "Technical Specification Group Radio Access Network; NR; User Equipment (UE) radio transmission and reception; Part 2: Range 2 Standalone (Release 17)," 3GPP TS 38.101-2 V17.9.0 (Mar. 2023).
Third Generation Partnership Project, "Technical Specification Group Radio Access Network; NR; User Equipment (UE) radio transmission and reception; Part 2: Range 2 Standalone (Release 18)," 3GPP TS 38.101-2 V18.1.0 (Mar. 2023).
Third Generation Partnership Project, "Technical Specification Group Radio Access Network; NR; Medium Access Control (MAC) protocol specification (Release 17)," 3GPP TS 38.321 V17.0.0 (Mar. 2022).
Third Generation Partnership Project, "Technical Specification Group Radio Access Network; NR; Medium Access Control (MAC) protocol specification (Release 17)," 3GPP TS 38.321 V17.4.0 (Mar. 2023).
Third Generation Partnership Project, "Technical Specification Group Radio Access Network; NR; Physical layer measurements (Release 17)," 3GPP TS 38.215 V17.3.0 (Mar. 2023).
Third Generation Partnership Project, "Technical Specification Group Radio Access Network; NR; Physical layer measurements (Release 17)," 3GPP TS 38.215 V17.1.0 (Mar. 2022).
Third Generation Partnership Project, "Technical Specification Group Radio Access Network; NR; User Equipment (UE) radio transmission and reception; Part 3: Range 1 and Range 2 Interworking operation with other radios (Release 17)," 3GPP TS 38.101-3 V17.5.0 (Mar. 2022).

(56) References Cited

OTHER PUBLICATIONS

Third Generation Partnership Project, "Technical Specification Group Radio Access Network; NR; User Equipment (UE) radio transmission and reception; Part 3: Range 1 and Range 2 Interworking operation with other radios (Release 17)," 3GPP TS 38.101-3 V17.9.0 (Mar. 2023).

Third Generation Partnership Project, "Technical Specification Group Radio Access Network; NR; User Equipment (UE) radio transmission and reception; Part 3: Range 1 and Range 2 Interworking operation with other radios (Release 18)," 3GPP TS 38.101-3 V18.1.0 (Mar. 2023).

* cited by examiner

310

```
UplinkConfigCommonSIB ::=                         SEQUENCE {
   frequencyInfoUL                                      FrequencyInfoUL-SIB,
   initialUplinkBWP                                     BWP-UplinkCommon,
   timeAlignmentTimerCommon                             TimeAlignmentTimer
}

BWP-UplinkCommon ::=                         SEQUENCE {
   genericParameters                               BWP,
   rach-ConfigCommon                               SetupRelease { RACH-ConfigCommon }
   pusch-ConfigCommon                              SetupRelease { PUSCH-ConfigCommon }
   pucch-ConfigCommon                              SetupRelease { PUCCH-ConfigCommon }
   ...,
   [[
   rach-ConfigCommonIAB-r16                        SetupRelease { RACH-ConfigCommon }
   useInterlacePUCCH-PUSCH-r16                     ENUMERATED {enabled}
   msgA-ConfigCommon-r16                           SetupRelease { MsgA-ConfigCommon-r16 }
   ]]
}

BWP ::=                                      SEQUENCE {
   locationAndBandwidth                            INTEGER (0..37949),
   subcarrierSpacing                               SubcarrierSpacing,
   cyclicPrefix                                    ENUMERATED { extended }
OPTIONAL    -- Need R
}
```

FIG. 3A

320

```
RACH-ConfigCommon ::=                                SEQUENCE {
   rach-ConfigGeneric                                    RACH-ConfigGeneric,
   totalNumberOfRA-Preambles                             INTEGER (1..63)
   ssb-perRACH-OccasionAndCB-PreamblesPerSSB                  CHOICE {
      oneEighth                                                   ENUMERATED
{n4,n8,n12,n16,n20,n24,n28,n32,n36,n40,n44,n48,n52,n56,n60,n64},
      oneFourth                                                   ENUMERATED
 {n4,n8,n12,n16,n20,n24,n28,n32,n36,n40,n44,n48,n52,n56,n60,n64},
 oneHalf                                                          ENUMERATED
{n4,n8,n12,n16,n20,n24,n28,n32,n36,n40,n44,n48,n52,n56,n60,n64},
      one                                                         ENUMERATED
 {n4,n8,n12,n16,n20,n24,n28,n32,n36,n40,n44,n48,n52,n56,n60,n64},
      two                                                         ENUMERATED
{n4,n8,n12,n16,n20,n24,n28,n32},
      four                                                        INTEGER (1..16),
      eight                                                       INTEGER (1..8),
      sixteen                                                     INTEGER (1..4)
   }
   ...,
}
```

A

FIG. 3B

A

```
RACH-ConfigGeneric ::=                          SEQUENCE {
   prach-ConfigurationIndex                            INTEGER (0..255),
   msg1-FDM                                            ENUMERATED {one, two, four, eight},
   msg1-FrequencyStart                                 INTEGER
(0..maxNrofPhysicalResourceBlocks-1),
   zeroCorrelationZoneConfig                           INTEGER(0..15),
   preambleReceivedTargetPower                         INTEGER (-202..-60),
   preambleTransMax                                    ENUMERATED {n3, n4, n5, n6, n7, n8, n10, n20, n50,
n100, n200},
   powerRampingStep                                    ENUMERATED {dB0, dB2, dB4, dB6},
   ra-ResponseWindow                                   ENUMERATED {sl1, sl2, sl4, sl8, sl10, sl20, sl40, sl80},
   ...,
   [[
   prach-ConfigurationPeriodScaling-IAB-r16                     ENUMERATED
{scf1,scf2,scf4,scf8,scf16,scf32,scf64}
   prach-ConfigurationFrameOffset-IAB-r16                       INTEGER (0..63)
   prach-ConfigurationSOffset-IAB-r16                           INTEGER (0..39)
   ra-ResponseWindow-v1610                                      ENUMERATED { sl60, sl160}
   prach-ConfigurationIndex-v1610                               INTEGER (256..262)
   ]]
}
```

FIG. 3B (Continued)

410

```
RACH-ConfigCommon ::=                                    SEQUENCE {
   rach-ConfigGeneric                                        RACH-ConfigGeneric,
   totalNumberOfRA-Preambles                                 INTEGER (1..63)
OPTIONAL,   -- Need S
   ssb-perRACH-OccasionAndCB-PreamblesPerSSB                     CHOICE {
      oneEighth                                                      ENUMERATED
{n4,n8,n12,n16,n20,n24,n28,n32,n36,n40,n44,n48,n52,n56,n60,n64},
      oneFourth                                                      ENUMERATED
{n4,n8,n12,n16,n20,n24,n28,n32,n36,n40,n44,n48,n52,n56,n60,n64},
      oneHalf                                                        ENUMERATED
 {n4,n8,n12,n16,n20,n24,n28,n32,n36,n40,n44,n48,n52,n56,n60,n64},
      one                                                            ENUMERATED
{n4,n8,n12,n16,n20,n24,n28,n32,n36,n40,n44,n48,n52,n56,n60,n64},
      two                                                            ENUMERATED
 {n4,n8,n12,n16,n20,n24,n28,n32},
      four                                                           INTEGER (1..16),
      eight                                                          INTEGER (1..8),
      sixteen                                                        INTEGER (1..4)
   }

   groupBconfigured                                          SEQUENCE {
      ra-Msg3SizeGroupA                                          ENUMERATED {b56, b144, b208, b256,
b282, b480, b640,
                                                                       b800, b1000, b72,
```

A

FIG. 4

Ⓐ

```
spare6, spare5,spare4, spare3, spare2, spare1},
      messagePowerOffsetGroupB                                ENUMERATED { minusinfinity, dB0, dB5,
dB8, dB10, dB12, dB15, dB18},
      numberOfRA-PreamblesGroupA                              INTEGER (1..64)
   }
   ra-ContentionResolutionTimer                               ENUMERATED { sf8, sf16, sf24, sf32,
sf40, sf48, sf56, sf64},
   rsrp-ThresholdSSB                                          RSRP-Range
   rsrp-ThresholdSSB-SUL                                      RSRP-Range
   prach-RootSequenceIndex                                    CHOICE {
      l839                                                          INTEGER (0..837),
      l139                                                          INTEGER (0..137)
   },
   msg1-SubcarrierSpacing                                     SubcarrierSpacing
   restrictedSetConfig                                        ENUMERATED {unrestrictedSet,
restrictedSetTypeA, restrictedSetTypeB},
   msg3-transformPrecoder                                     ENUMERATED {enabled}
   ...,
   [[
   ra-PrioritizationForAccessIdentity-r16                     SEQUENCE {
      ra-Prioritization-r16                                         RA-Prioritization,
      ra-PrioritizationForAI-r16                                    BIT STRING (SIZE (2))
   }
   prach-RootSequenceIndex-r16                                CHOICE {
      l571                                                          INTEGER (0..569),
      l1151                                                         INTEGER (0..1149)
   }
   ]]
}
```

FIG. 4 (Continued)

510

```
RACH-ConfigDedicated ::=                        SEQUENCE {
   cfra                                              CFRA
   ra-Prioritization                                 RA-Prioritization
   ...,
   [[
   ra-PrioritizationTwoStep-r16                      RA-Prioritization
   cfra-TwoStep-r16                                  CFRA-TwoStep-r16
   ]]
}

CFRA ::=                                   SEQUENCE {
   occasions                                         SEQUENCE {
      rach-ConfigGeneric                                  RACH-ConfigGeneric,
      ssb-perRACH-Occasion                                ENUMERATED {oneEighth, oneFourth, oneHalf, one,
two, four, eight, sixteen}

   }
   resources                                         CHOICE {
      ssb                                                 SEQUENCE {
         ssb-ResourceList                                      SEQUENCE (SIZE(1..maxRA-SSB-Resources))
OF CFRA-SSB-Resource,
         ra-ssb-OccasionMaskIndex                              INTEGER (0..15)
      },
```

A

FIG. 5

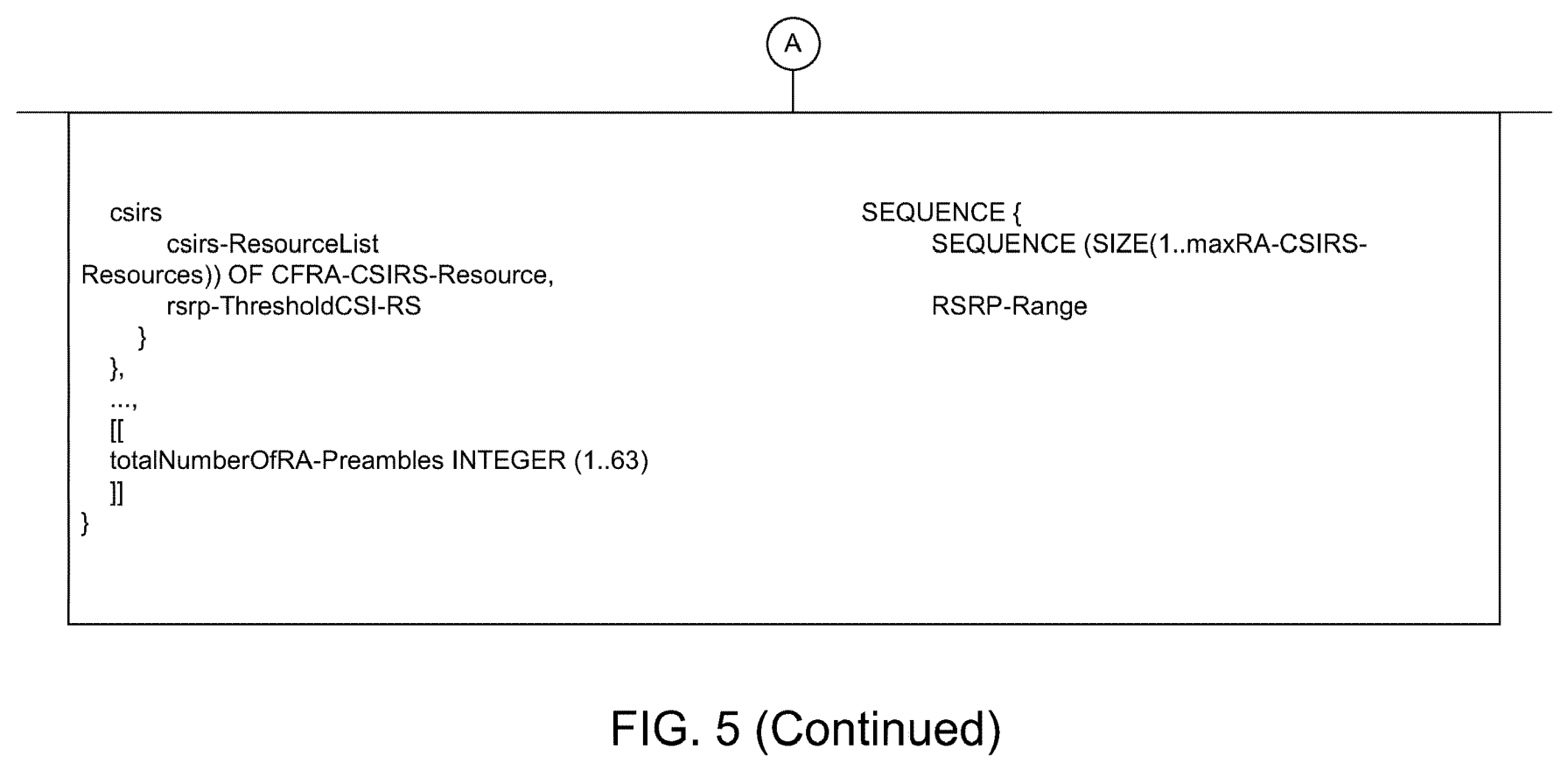

(A)

```
    csirs                                                  SEQUENCE {
          csirs-ResourceList                                   SEQUENCE (SIZE(1..maxRA-CSIRS-
Resources)) OF CFRA-CSIRS-Resource,
          rsrp-ThresholdCSI-RS                                 RSRP-Range
       }
    },
    ...,
    [[
    totalNumberOfRA-Preambles INTEGER (1..63)
    ]]
}
```

FIG. 5 (Continued)

810

```
RACH-ConfigGeneric ::=                          SEQUENCE {
        prach-ConfigurationIndex                        INTEGER (0..255),
        msg1-FDM                                        ENUMERATED {one, two, four, eight},
        msg1-FrequencyStart                             INTEGER
(0..maxNrofPhysicalResourceBlocks-1),
        zeroCorrelationZoneConfig                       INTEGER(0..15),
        preambleReceivedTargetPower                     INTEGER (-202..-60),
        preambleTransMax                                ENUMERATED {n3, n4, n5, n6, n7, n8,
n10, n20, n50, n100, n200},
        powerRampingStep                                ENUMERATED {dB0, dB2, dB4, dB6},
        ra-ResponseWindow                               ENUMERATED {sl1, sl2, sl4, sl8, sl10,
sl20, sl40, sl80},
        ...,
        [[
        prach-ConfigurationPeriodScaling-IAB-r16                ENUMERATED
{scf1,scf2,scf4,scf8,scf16,scf32,scf64}
        prach-ConfigurationFrameOffset-IAB-r16                  INTEGER (0..63)
        prach-ConfigurationSOffset-IAB-r16                      INTEGER (0..39)
        ra-ResponseWindow-v1610                                 ENUMERATED { sl60, sl160}
        prach-ConfigurationIndex-v1610                          INTEGER (256..262)
        ]]
}
```

FIG. 8

910

```
RACH-ConfigGeneric ::=                    SEQUENCE {
   prach-ConfigurationIndex                     INTEGER (0..255),
   msg1-FDM                                     ENUMERATED {one, two, four, eight},
   msg1-FrequencyStart                          INTEGER (0..maxNrofPhysicalResourceBlocks-1),
   zeroCorrelationZoneConfig                    INTEGER(0..15),
   preambleReceivedTargetPower                  INTEGER (-202..-60),
   preambleTransMax                             ENUMERATED {n3, n4, n5, n6, n7, n8, n10, n20, n50,
n100, n200},
   powerRampingStep                             ENUMERATED {dB0, dB2, dB4, dB6},
   ra-ResponseWindow                            ENUMERATED {sl1, sl2, sl4, sl8, sl10, sl20, sl40, sl80},
   ...,
}
```

FIG. 9

1410

```
RACH-ConfigCommon ::=                         SEQUENCE {
   rach-ConfigGeneric                             RACH-ConfigGeneric,
   rach-MultiConfigGeneric                        RACH-MultiConfigGeneric,
   totalNumberOfRA-Preambles                      INTEGER (1..63)
   ssb-perRACH-OccasionAndCB-PreamblesPerSSB               CHOICE {
      oneEighth                                                    ENUMERATED
{n4,n8,n12,n16,n20,n24,n28,n32,n36,n40,n44,n48,n52,n56,n60,n64},
      oneFourth                                                    ENUMERATED
{n4,n8,n12,n16,n20,n24,n28,n32,n36,n40,n44,n48,n52,n56,n60,n64},
      oneHalf                                                      ENUMERATED
{n4,n8,n12,n16,n20,n24,n28,n32,n36,n40,n44,n48,n52,n56,n60,n64},
      one                                                          ENUMERATED
{n4,n8,n12,n16,n20,n24,n28,n32,n36,n40,n44,n48,n52,n56,n60,n64},
      two                                                          ENUMERATED
{n4,n8,n12,n16,n20,n24,n28,n32},
      four                                                         INTEGER (1..16),
      eight                                                        INTEGER (1..8),
      sixteen                                                      INTEGER (1..4)
   }
   ...,
}
```

A

FIG. 14

```
RACH-ConfigGeneric ::=                    SEQUENCE {
   prach-ConfigurationIndex                  INTEGER (0..255),
   msg1-FDM                                  ENUMERATED {one, two, four, eight},
   msg1-FrequencyStart                       INTEGER (0..maxNrofPhysicalResourceBlocks-1),
   rach-CdSsbIndex                          INTEGER (0.. maxCellDefiningSSBs-1),
   ...,
}

RACH-MultiConfigGeneric ::=                  SEQUENCE {
   msg1-OtherGroupFrequencyStart                SEQUENCE (SIZE (1.. maxNrofPrachConfigGroups-1)) OF
INTEGER (0..maxNrofPhysicalResourceBlocks-1),
   msg1-OtherGroupFrequencyStartIndex           INTEGER (1..maxNrofPrachConfigGroups-1),
   rach-OtherGroupCdSsbIndex                    SEQUENCE (SIZE (1.. maxNrofPrachConfigGroups-1)) OF
INTEGER (0.. maxCellDefiningSSBs-1),
   ...,
}
```

FIG. 14 (Continued)

1510

```
BWP-UplinkCommon ::=                              SEQUENCE {
        genericParameters                                 BWP,
        multiRACHGenericParameters                        BWP,
        rach-ConfigCommon                                 SetupRelease { RACH-ConfigCommon }
        pusch-ConfigCommon                                SetupRelease { PUSCH-ConfigCommon }
        pucch-ConfigCommon                                SetupRelease { PUCCH-ConfigCommon }
        ...,
        [[
        rach-ConfigCommonIAB-r16                          SetupRelease { RACH-ConfigCommon }
        useInterlacePUCCH-PUSCH-r16                       ENUMERATED {enabled}
        msgA-ConfigCommon-r16                             SetupRelease { MsgA-ConfigCommon-r16 }
        ]]
}

BWP ::=                                           SEQUENCE {
        locationAndBandwidth                              INTEGER (0..37949),
        subcarrierSpacing                                 SubcarrierSpacing,
        cyclicPrefix                                      ENUMERATED { extended }
OPTIONAL    -- Need R
```

FIG. 15

RACH ENHANCEMENTS FOR RADAR COEXISTENCE

CROSS-REFERENCE TO RELATED APPLICATIONS

This application claims the benefit of U.S. Provisional Application No. 63/336,665, filed Apr. 29, 2022, the contents of which are incorporated herein by reference.

STATEMENT OF GOVERNMENT RIGHTS

This invention was made with government support under project NSC-20-2084: Dynamic Spectrum Sharing 5G networks enhancement prototype, also known as ENhanced SecURity and co-Existence for DoD-5G (ENSURED-5G); OTA Number W15QKN-15-9-1004, Base and Project Agreement 2017-314A-Mod-03, Subcontract 2021-01. The government has certain rights in the invention.

BACKGROUND

Recent trends are driving researchers to create solutions for cellular network deployments in the presence of high-power narrowband interferers (e.g., RADARs). Although the baseline functionality provided by 5G could be used to provide some level of coexistence with RADARs, enhancements are needed to realize the full 5G potential.

When a narrow-band high power interferer, such as RADAR, operates in a band that overlaps with the resource blocks (RBs) used by a wireless transmit receive unit (WTRU) to transmit RACH preambles, the gNB may not be able to receive the RACH preambles reliably due to a high level of interference, which will lead to high probability of random-access failures. And even for scenarios where the RACH preambles can be received reliably in the presence of the interference, there is the potential for the preamble transmissions to interfere with RADAR, which is also problematic.

SUMMARY

Aspects, features and advantages of the disclosed embodiments ensure robust and efficient RACH preamble transmission and reception can occur when coexisting with RADARs. According to a first aspect, one or more first RACH preambles are transmitted based on a first RACH configuration. The WTRU may receive an RAR with an indication that the first RACH configuration is unavailable. The WTRU may then retrieve a second RACH configuration information. The WTRU may then transmit one or more second RACH preambles based on the second RACH configuration and then completes a random access procedure based on the second RACH configuration. In embodiments, the process may further include wherein the second RACH configuration is retrieved from a stored SIB. In embodiments the process may further include wherein the second RACH configuration is retrieved from a most-recently received SIB message. In embodiments the process may further include wherein the second RACH configuration is retrieved from the RAR. In embodiments the process may further include wherein frequency domain resources of a RACH configuration are defined by a start frequency location and information related to a number of frequency-multiplexed RACH occasions, which may be defined by, for example, msg1-FrequencyStart and msg1-FDM. In embodiments the process may further include wherein the second RACH configuration, which may be defined by a different set of msg1-FrequencyStart and msg1-FDM, is desegregated from the first RACH configuration in the frequency domain. In embodiments the process may further include, wherein a second RACH configuration frequency location is included in the RAR.

BRIEF DESCRIPTION OF THE DRAWINGS

A more detailed understanding may be had from the following description, given by way of example in conjunction with the accompanying drawings, wherein like reference numerals in the figures indicate like elements, and wherein:

FIG. 3A shows an example uplink configuration;

FIG. 3B shows an example RACH configuration;

FIG. 4 shows an example RACH configuration;

FIG. 5 shows an example dedicated RACH configuration;

FIG. 8 shows an example RACH configuration;

FIG. 9 shows an example RACH configuration;

FIG. 14 shows an example RACH configuration;

FIG. 15 shows an example uplink BWP configuration;

DETAILED DESCRIPTION

Figure 1A:
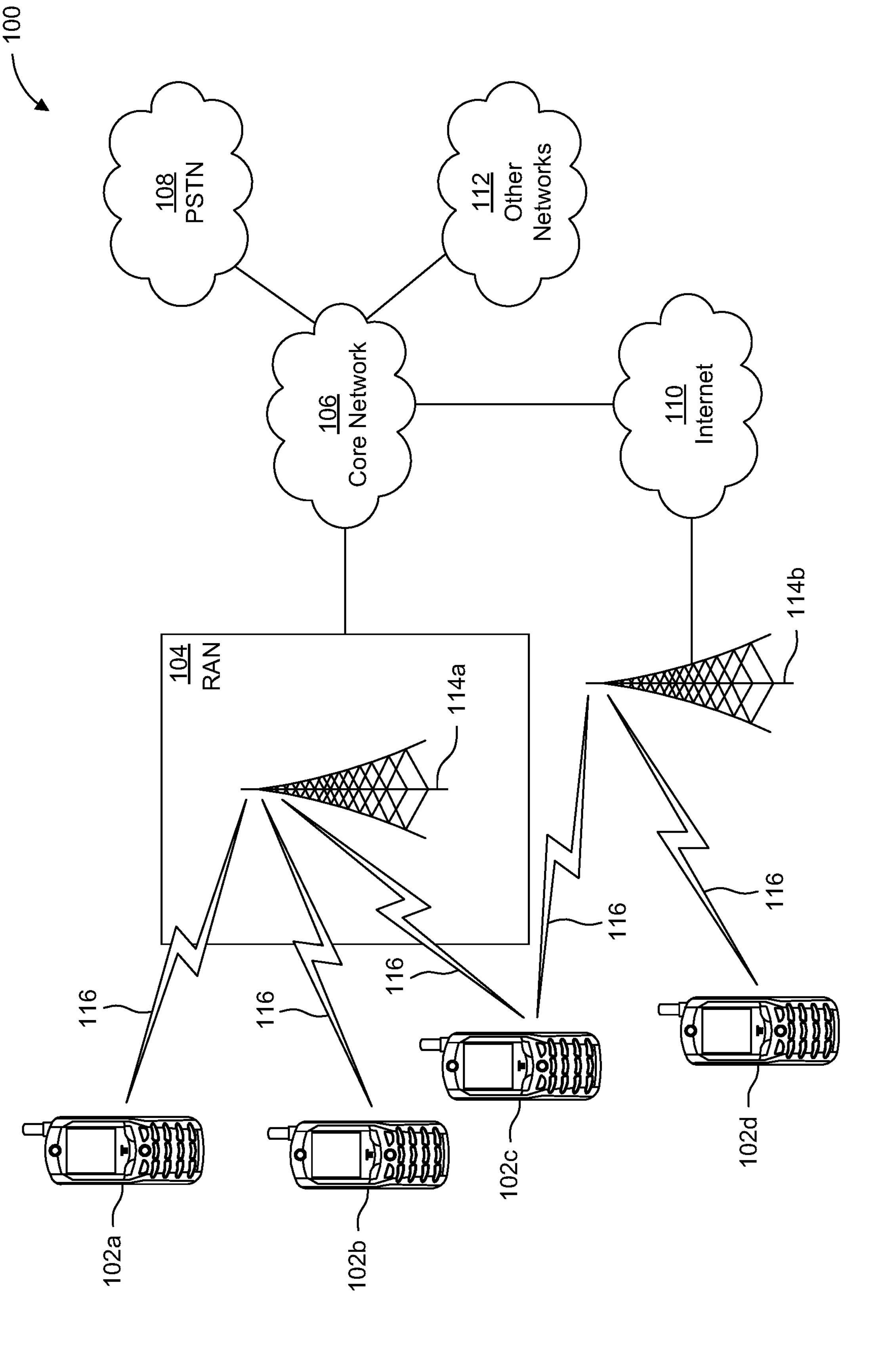
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a UE.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the CN 106, the Internet 110, and/or the other networks 112. By way of example, the base stations 114*a*, 114*b* may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104, which may also include other base stations and/or network elements (not shown), such as a base station controller (BSC), a radio network controller (RNC), relay nodes, and the like. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104 and the WTRUs 102*a*, 102*b*, 102*c* may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using NR.

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., an eNB and a gNB).

In other embodiments, the base station 114*a* and the WTRUs 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102*a*, 102*b*, 102*c*, 102*d*. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
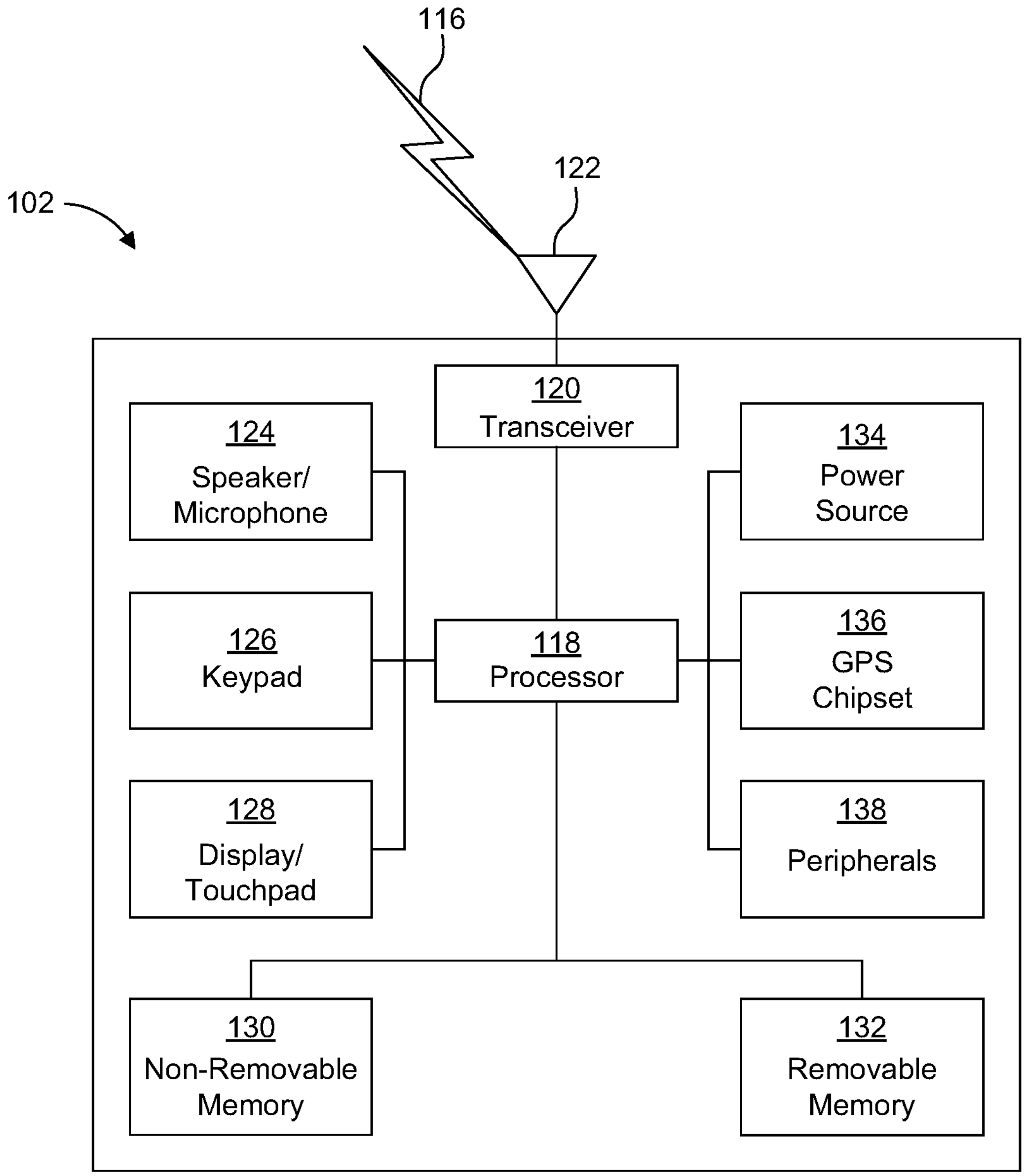
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
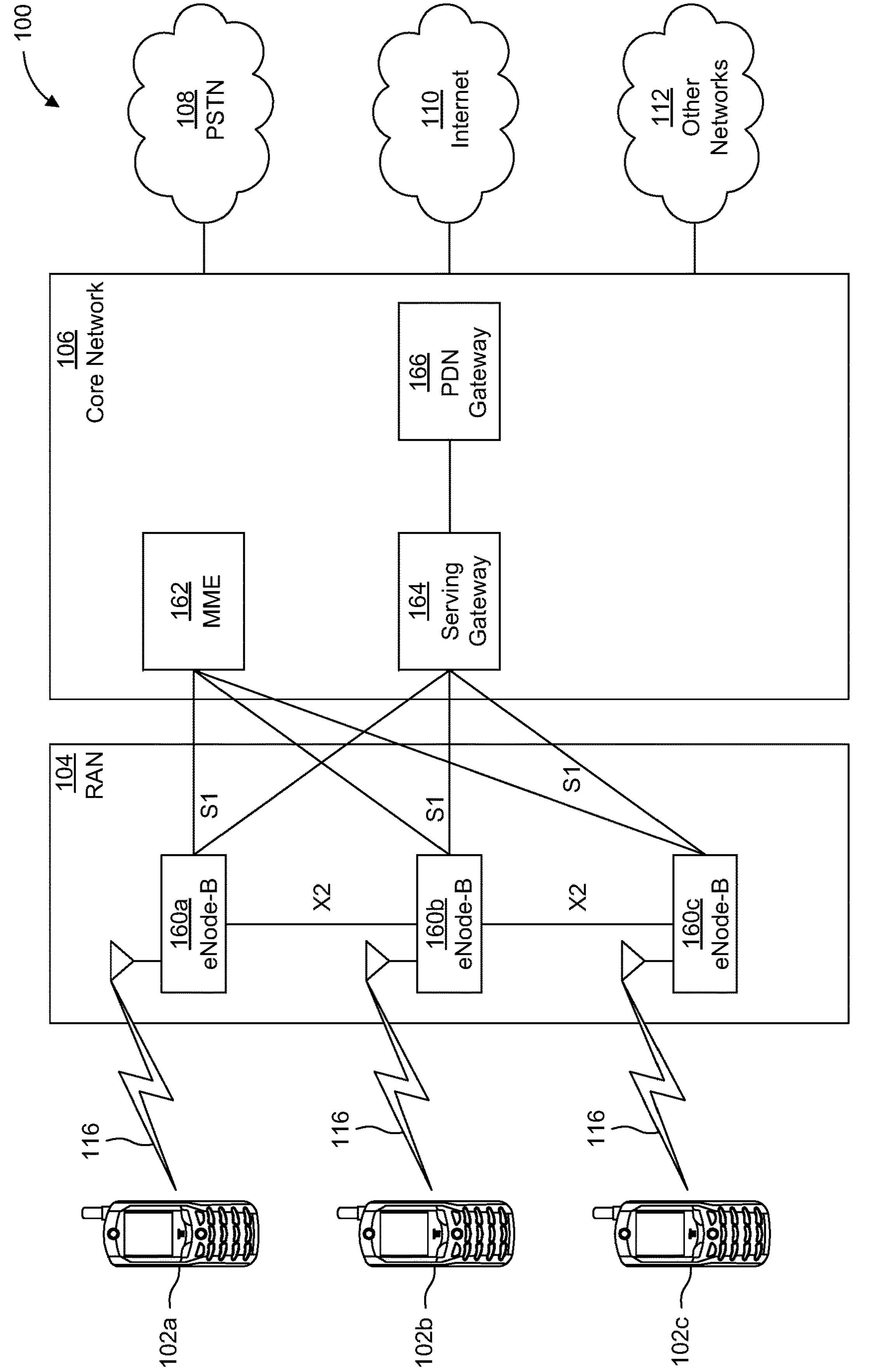
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102*a*, 102*b*, 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In one embodiment, the eNode-Bs 160*a*, 160*b*, 160*c* may implement MIMO technology. Thus, the eNode-B 160*a*, for example, may use multiple antennas to transmit wireless signals to, and/or receive wireless signals from, the WTRU 102*a*.

Each of the eNode-Bs 160*a*, 160*b*, 160*c* may be associated with a particular cell (not shown) and may be configured to handle radio resource management decisions, handover decisions, scheduling of users in the UL and/or DL, and the like. As shown in FIG. 1C, the eNode-Bs 160*a*, 160*b*, 160*c* may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162*a*, 162*b*, 162*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
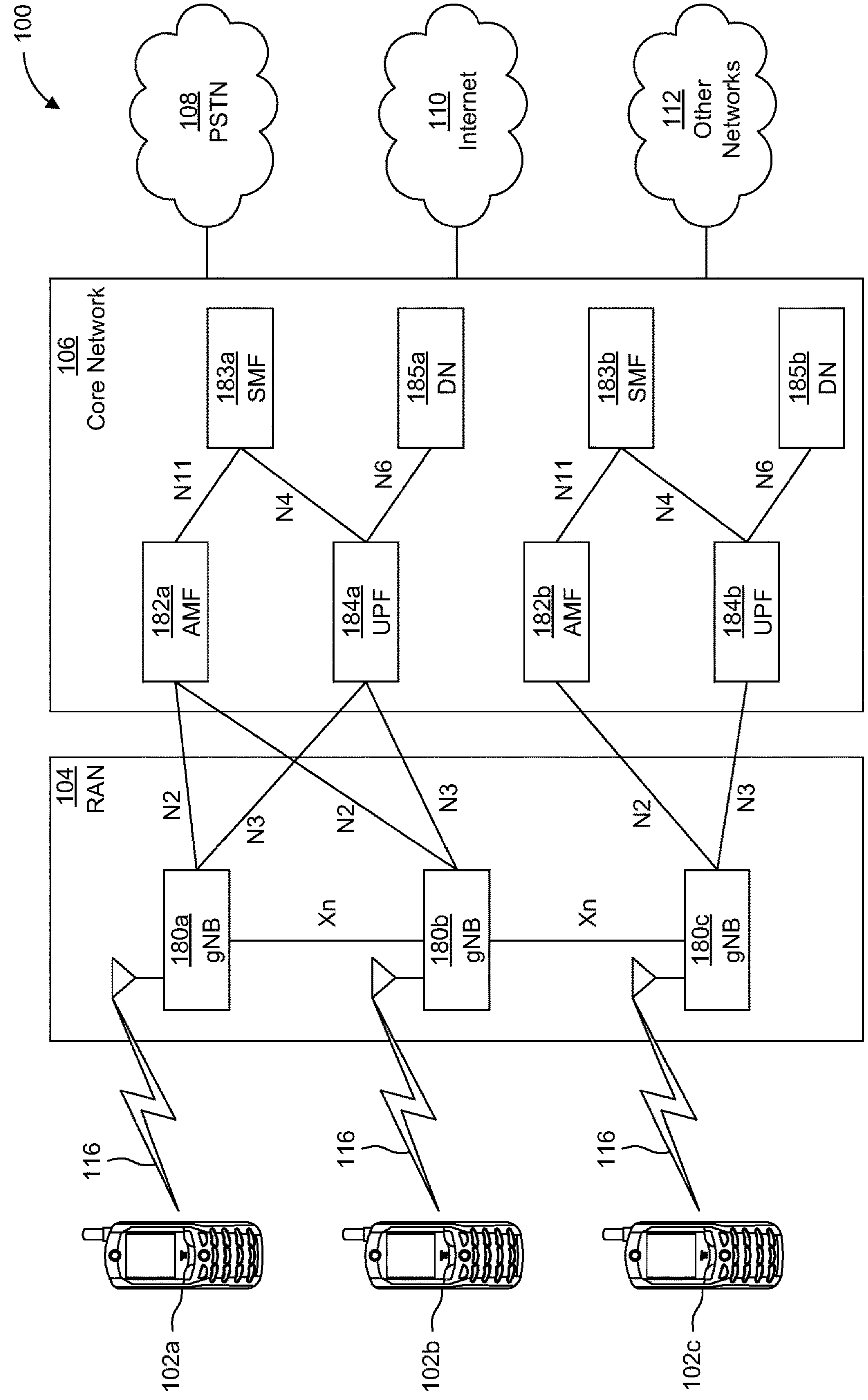
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102*a*, 102*b*, 102*c* over the air interface 116. The RAN 104 may also be in communication with the CN 106.

The RAN 104 may include gNBs 180*a*, 180*b*, 180*c*, though it will be appreciated that the RAN 104 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180*a*, 108*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (CoMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, the OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., containing a varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode-Bs 160*a*, 160*b*, 160*c*). In the standalone configuration, WTRUs 102*a*, 102*b*, 102*c* may utilize one or more of gNBs 180*a*, 180*b*, 180*c* as a mobility anchor point. In the standalone configuration, WTRUs 102*a*, 102*b*, 102*c* may communicate with gNBs 180*a*, 180*b*, 180*c* using signals in an unlicensed band. In a non-standalone configuration WTRUs 102*a*, 102*b*, 102*c* may communicate with/connect to gNBs 180*a*, 180*b*, 180*c* while also communicating with/connecting to another RAN such as eNode-Bs 160*a*, 160*b*, 160*c*. For example, WTRUs 102*a*, 102*b*, 102*c* may implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184*a*, 184*b*, routing of control plane information towards Access and Mobility Management Function (AMF) 182*a*, 182*b* and the like. As shown in FIG. 1D, the gNBs 180*a*, 180*b*, 180*c* may communicate with one another over an Xn interface.

The CN 106 shown in FIG. 1D may include at least one AMF 182*a*, 182*b*, at least one UPF 184*a*,184*b*, at least one Session Management Function (SMF) 183*a*, 183*b*, and possibly a Data Network (DN) 185*a*, 185*b*. While the foregoing elements are depicted as part of the CN 106, it will be appreciated that any of these elements may be owned and/or operated by an entity other than the CN operator.

The AMF 182*a*, 182*b* may be connected to one or more of the gNBs 180*a*, 180*b*, 180*c* in the RAN 104 via an N2 interface and may serve as a control node. For example, the AMF 182*a*, 182*b* may be responsible for authenticating users of the WTRUs 102*a*, 102*b*, 102*c*, support for network slicing (e.g., handling of different protocol data unit (PDU) sessions with different requirements), selecting a particular SMF 183*a*, 183*b*, management of the registration area, termination of non-access stratum (NAS) signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for MTC access, and the like. The AMF 182*a*, 182*b* may provide a control plane function for switching between the RAN 104 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 106 via an N11 interface. The SMF 183*a*, 183*b* may also be connected to a UPF 184*a*, 184*b* in the CN 106 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 104 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local DN 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-b*, UPF 184*a-b*, SMF 183*a-b*, DN 185*a-b*, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Figure 2:
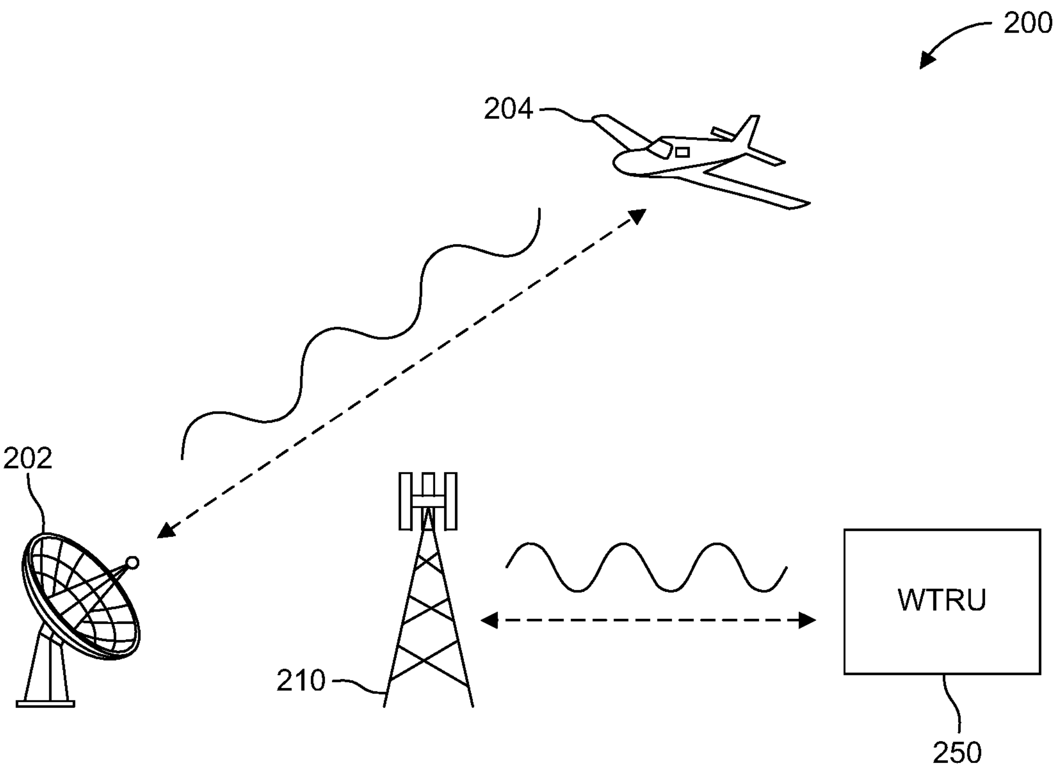
FIG. 2 is a diagram depicting a potential scenario of a wireless network encountering interference from RADAR.

The following abbreviations may be referred to herein:

3GPP Third Generation Partnership Project
5G 5th Generation
AOA Angle of Arrival
BI Backoff Indicator
BW Bandwidth
C-RNTI Cell Radio Network Temporary Identifier
CSI-RS Channel State Information Reference Signal
DCI Downlink Control Information
DL Downlink
DRX Discontinuous Reception
ENSURED-5G Enhanced Security and Co-Existence for DoD-5G
FDD Frequency Division Duplex
FDM Frequency Division Multiplexing
FR Frequency Range
gNB Next Generation (5G) NodeB
MAC Medium Access Control
MCS Modulation and Coding Scheme
NR New Radio
OFDM Orthogonal Frequency Division Multiplexing
PBCH Physical Broadcast Channel
PDCCH Physical Downlink Control Channel
PDU Protocol Data Unit
PHY Physical Layer
PRACH Physical Random Access Channel
PRB Physical Resource Block
PSD Power Spectral Density
PUSCH Physical Uplink Shared Channel
QCL Quasi-Collocated
RACH Random Access Channel
RADAR Radio Detection and Ranging
RAPID Random Access Preamble ID
RAR Random Access Response
RB Resource Block
RO RACH Occasion
RRC Radio Resource Control
SI System Information
SIB System Information Block
SSB SS/PBCH Block
TB Transport Block
TDD Time Division Duplex
UL Uplink Referring to FIG. 2, an example potential interference scenario 200 is shown where communications between a base station 210 and a remote WTRU 250 may be adversely impacted by the presence of narrowband interferers, such as RADAR station 202 and/or RADAR on plane 204 (or reflections therefrom). The example embodiments that follow, address potential interference avoidance solutions for RACH communications between a WTRU 250 and base station 210.

RACH configurations are described herein. Random access preambles can only be transmitted starting from the frequency resources given by the higher-layer parameter msg1-FrequencyStart. The PRACH frequency resources nRA∈{0,1, . . . , M−1}, where M equals the higher-layer parameter msg1-FDM, are numbered in increasing order within the initial UL BWP during initial access, starting from the lowest frequency. Otherwise, nRA are numbered in increasing order within the active UL BWP, starting from the lowest frequency.

FIG. 3A shows exemplary uplink configuration 310. FIG. 3B shows an exemplary RACH configuration 320.

There can be up to 64 preambles available within a cell (as defined by totalNumberOfRA-Preambles) with each preamble identified by a preamble index in the range from 0 to 63. Not all 64 preambles available in a cell may be used for normal contention-based random access. The remaining preambles can be used for contention-free random access, for example, for mobility/handover.

Within a cell, preamble transmission can take place within a configurable subset of slots (the RACH slots) within a specific frame. The set of RACH slots is then repeated every Nth frame when N can range from N=1 (i.e., there are RACH slots in every frame) to N=16 (RACH slots in every 16th frame).

Within the RACH slots, there may be multiple frequency domain RACH occasions jointly covering $$(\text{msg1}-FDM)*N_{RB}^{RA}$$

consecutive resource blocks, where $$N_{RB}^{RA}$$

is the size of a frequency domain RACH occasion, i.e., the size of the frequency resource assigned for each preamble measured in number of resource blocks, and msg1-FDM is the number of frequency domain RACH occasions. Thus, up to msg1-FDM preamble transmissions from different WTRUs can be frequency multiplexed within one RACH slot.

In NR there may be two types of preambles, referred to as long preambles and short preambles, respectively. The two preamble types differ in terms of the length of the preamble sequence ($L_{RA}$). They also differ in the subcarrier spacing used for the preamble transmission. The type of the preamble is part of the cell random-access configuration. That is, only one type of preamble can be used for initial access within a cell. Table 1 describes long preamble type formats. Table 2 describes short preamble type formats.

TABLE 1

Long preamble formats

| Format | $L_{RA}$ | $\Delta f_{RA}$ | $N_u$ | $N_{CP}^{RA}$ | Support for restricted sets |
|---|---|---|---|---|---|
| 0 | 839 | 1.25 KHz | 24576κ | 3168κ | Type A, Type B |
| 1 | 839 | 1.25 KHz | 2 · 24576κ | 21024κ | Type A, Type B |
| 2 | 839 | 1.25 KHz | 4 · 24576κ | 4688κ | Type A, Type B |
| 3 | 839 | 5 KHz | 4 · 6144κ | 3168κ | Type A, Type B |

TABLE 2

Short preamble formats

| Format | $L_{RA}$ μ ∈ {0, 1, 2, 3} | $L_{RA}$ μ = 0 | $L_{RA}$ μ = 1 | $\Delta f_{RA}$ | $N_u$ | $N_{CP}^{RA}$ |
|---|---|---|---|---|---|---|
| A1 | 139 | 1151 | 571 | $15 \cdot 2^{\mu}$ kHz | $2 \cdot 2048\kappa \cdot 2^{-\mu}$ | $288\kappa \cdot 2^{-\mu}$ |
| A2 | 139 | 1151 | 571 | $15 \cdot 2^{\mu}$ kHz | $4 \cdot 2048\kappa \cdot 2^{-\mu}$ | $576\kappa \cdot 2^{-\mu}$ |
| A3 | 139 | 1151 | 571 | $15 \cdot 2^{\mu}$ kHz | $6 \cdot 2048\kappa \cdot 2^{-\mu}$ | $864\kappa \cdot 2^{-\mu}$ |
| B1 | 139 | 1151 | 571 | $15 \cdot 2^{\mu}$ kHz | $2 \cdot 2048\kappa \cdot 2^{-\mu}$ | $216\kappa \cdot 2^{-\mu}$ |
| B2 | 139 | 1151 | 571 | $15 \cdot 2^{\mu}$ kHz | $4 \cdot 2048\kappa \cdot 2^{-\mu}$ | $360\kappa \cdot 2^{-\mu}$ |
| B3 | 139 | 1151 | 571 | $15 \cdot 2^{\mu}$ kHz | $6 \cdot 2048\kappa \cdot 2^{-\mu}$ | $504\kappa \cdot 2^{-\mu}$ |
| B4 | 139 | 1151 | 571 | $15 \cdot 2^{\mu}$ kHz | $12 \cdot 2048\kappa \cdot 2^{-\mu}$ | $936\kappa \cdot 2^{-\mu}$ |
| C0 | 139 | 1151 | 571 | $15 \cdot 2^{\mu}$ kHz | $2048\kappa \cdot 2^{-\mu}$ | $1240\kappa \cdot 2^{-\mu}$ |
| C2 | 139 | 1151 | 571 | $15 \cdot 2^{\mu}$ kHz | $4 \cdot 2048\kappa \cdot 2^{-\mu}$ | $2048\kappa \cdot 2^{-\mu}$ |

The size of a frequency domain RACH occasion, $$N_{RB}^{RA},$$

depends on the preamble type. Table 3 describes supported preamble combinations.

TABLE 3

Supported preamble combinations

| $L_{RA}$ | $\Delta f_{RA}$ for PRACH | Δf for PUSCH | $N_{RB}^{RA}$, allocation expressed in number of RBs for PUSCH | $\bar{k}$ |
|---|---|---|---|---|
| 839 | 1.25 | 15 | 6 | 7 |
| 839 | 1.25 | 30 | 3 | 1 |
| 839 | 1.25 | 60 | 2 | 133 |
| 839 | 5 | 15 | 24 | 12 |
| 839 | 5 | 30 | 12 | 10 |
| 839 | 5 | 60 | 6 | 7 |
| 139 | 15 | 15 | 12 | 2 |
| 139 | 15 | 30 | 6 | 2 |
| 139 | 15 | 60 | 3 | 2 |
| 139 | 30 | 15 | 24 | 2 |
| 139 | 30 | 30 | 12 | 2 |
| 139 | 30 | 60 | 6 | 2 |
| 139 | 60 | 60 | 12 | 2 |
| 139 | 60 | 120 | 6 | 2 |
| 139 | 120 | 60 | 24 | 2 |
| 139 | 120 | 120 | 12 | 2 |
| 571 | 30 | 15 | 96 | 2 |
| 571 | 30 | 30 | 48 | 2 |
| 571 | 30 | 60 | 24 | 2 |
| 1151 | 15 | 15 | 96 | 1 |
| 1151 | 15 | 30 | 48 | 1 |
| 1151 | 15 | 60 | 24 | 1 |

A given preamble type, corresponding to a certain preamble bandwidth, the overall available time/frequency RACH resource within a cell may be described by: a configurable RACH periodicity which can range from 10 ms up to 160 ms, a configurable set of RACH slots within the RACH period (all in the same frame), a configurable frequency domain RACH resource given by the index of the first resource block in the resource (msg1-FrequencyStart), and the number of frequency multiplexed RACH occasions (msg1-FDM).

Random access preambles can only be transmitted in specified time resources and depend on FR1 or FR2 and the spectrum type, as shown, for example in Table 4, which shows example random access configurations for FR1 and unpaired spectrum.

TABLE 4

Example random access configurations for FR1 and unpaired spectrum

| PRACH Configuration Index | Preamble format | $n_f$ mod x = y: x | y | Subframe number | Starting symbol | Number of PRACH slots within a subframe | $N_t^{RA,slot}$, number of time-domain PRACH occasions within a PRACH slot | $N_{dur}^{RA}$, PRACH duration |
|---|---|---|---|---|---|---|---|---|
| 87 | A2 | 16 | 1 | 9 | 0 | 2 | 3 | 4 |
| 88 | A2 | 8 | 1 | 9 | 0 | 2 | 3 | 4 |
| 89 | A2 | 4 | 1 | 9 | 0 | 1 | 3 | 4 |
| 90 | A2 | 2 | 1 | 7, 9 | 0 | 1 | 3 | 4 |
| 91 | A2 | 2 | 1 | 8, 9 | 0 | 2 | 3 | 4 |
| 92 | A2 | 2 | 1 | 7, 9 | 9 | 1 | 1 | 4 |
| 93 | A2 | 2 | 1 | 4, 9 | 9 | 1 | 1 | 4 |
| 94 | A2 | 2 | 1 | 4, 9 | 0 | 2 | 3 | 4 |
| 95 | A2 | 2 | 1 | 2, 3, 4, 7, 8, 9 | 0 | 1 | 3 | 4 |
| 96 | A2 | 1 | 0 | 2 | 0 | 1 | 3 | 4 |
| 97 | A2 | 1 | 0 | 7 | 0 | 1 | 3 | 4 |
| 98 | A2 | 2 | 1 | 9 | 0 | 1 | 3 | 4 |
| 99 | A2 | 1 | 0 | 9 | 0 | 2 | 3 | 4 |
| 100 | A2 | 1 | 0 | 9 | 9 | 1 | 1 | 4 |
| 101 | A2 | 1 | 0 | 9 | 0 | 1 | 3 | 4 |
| 102 | A2 | 1 | 0 | 2, 7 | 0 | 1 | 3 | 4 |
| 103 | A2 | 1 | 0 | 8, 9 | 0 | 2 | 3 | 4 |
| 104 | A2 | 1 | 0 | 4, 9 | 0 | 1 | 3 | 4 |
| 105 | A2 | 1 | 0 | 7, 9 | 9 | 1 | 1 | 4 |
| 106 | A2 | 1 | 0 | 3, 4, 8, 9 | 0 | 1 | 3 | 4 |
| 107 | A2 | 1 | 0 | 3, 4, 8, 9 | 0 | 2 | 3 | 4 |
| 108 | A2 | 1 | 0 | 1, 3, 5, 7, 9 | 0 | 1 | 3 | 4 |
| 109 | A2 | 1 | 0 | 0, 1, 2, 3, 4, 5, 6, 7, 8, 9 | 9 | 1 | 1 | 4 |

Depending on the exact set of preambles used in a cell, there may also be multiple RACH occasions (also known as PRACH occasions) in the time domain within a RACH slot (also known as PRACH slot). The PRACH occasions are mapped consecutively per corresponding SS/PBCH block index. The indexing of the PRACH occasion indicated by the mask index value is reset per mapping cycle of consecutive PRACH occasions per SS/PBCH block index. The WTRU selects for a PRACH transmission the PRACH occasion indicated by PRACH mask index value for the indicated SS/PBCH block index in the first available mapping cycle. For the indicated preamble index, the ordering of the PRACH occasions is: first, in increasing order of frequency resource indexes for frequency multiplexed PRACH occasions; second, in increasing order of time resource indexes for time multiplexed PRACH occasions within a PRACH slot; and third, in increasing order of indexes for PRACH slots.

For a PRACH transmission triggered upon request by higher layers, a value of ra-OccasionList, if csirs-ResourceList is provided, indicates a list of PRACH occasions for the PRACH transmission where the PRACH occasions are associated with the selected CSI-RS index indicated by csi-RS. The indexing of the PRACH occasions indicated by ra-OccasionList is reset per association pattern period.

SS/PBCH block indexes provided by ssb-PositionsInBurst in SIB1 or in ServingCellConfigCommon are mapped to valid PRACH occasions in the following order: first, in increasing order of preamble indexes within a single PRACH occasion; second, in increasing order of frequency resource indexes for frequency multiplexed PRACH occasions; third, in increasing order of time resource indexes for time multiplexed PRACH occasions within a PRACH slot; and fourth, in increasing order of indexes for PRACH slots.

The number of SS/PBCH block time indexes per RACH time/frequency occasion may be larger than one, indicating that multiple SS/PBCH block time indexes correspond to a single RACH time/frequency occasion. However, it may also be smaller than one, indicating that one single SS/PBCH block time index corresponds to multiple RACH time/frequency occasions. In the former case, each RACH occasion corresponds to multiple SS/PBCH block indexes and these different SS/PBCH block indexes are mapped to different sets of preambles. In the latter case, each RACH occasion corresponds to a single SS/PBCH block index, that is, the RACH occasion in itself indicates the SS/PBCH block index. In this case, each SS/PBCH block index may be mapped to the same set of preambles. An association period, starting from frame 0, for mapping SS/PBCH block indexes to PRACH occasions, is the smallest value in the set determined by the PRACH configuration period according to Table 6 such that $$N_{Tx}^{SSB}$$

SS/PBCH block indexes are mapped at least once to the PRACH occasions within the association period, where a WTRU obtains $$N_{Tx}^{SSB}$$

from the value of ssb-PositionsInBurst in SIB1 or in ServingCellConfigCommon. If after an integer number of SS/PBCH block indexes to PRACH occasions mapping cycles within the association period there is a set of PRACH occasions or PRACH preambles that are not mapped to $$N_{Tx}^{SSB}$$

SS/PBCH block indexes, no SS/PBCH block indexes are mapped to the set of PRACH occasions or PRACH preambles. An association pattern period includes one or more association periods and is determined so that a pattern between PRACH occasions and SS/PBCH block indexes repeats at most every 160 msec. PRACH occasions not associated with SS/PBCH block indexes after an integer number of association periods, if any, are not used for PRACH transmissions. Mapping between PRACH configuration period and SS/PBCH block to PRACH occasion association period is shown in Table 6.

TABLE 6

| PRACH configuration period (msec) | Association period (number of PRACH configuration periods) |
|---|---|
| 10 | {1, 2, 4, 8, 16} |
| 20 | {1, 2, 4, 8} |
| 40 | {1, 2, 4} |
| 80 | {1, 2} |
| 160 | {1} |

For a PRACH transmission triggered by a PDCCH order, the PRACH mask index field, if the value of the random access preamble index field is not zero, indicates the PRACH occasion for the PRACH transmission where the PRACH occasions are associated with the SS/PBCH block index indicated by the SS/PBCH block index field of the PDCCH order.

For a PRACH transmission triggered by higher layers, if ssb-ResourceList is provided, the PRACH mask index is indicated by ra-ssb-OccasionMaskIndex which indicates the PRACH occasions for the PRACH transmission where the PRACH occasions are associated with the selected SS/PBCH block index.

With reference to FIG. 4, 410, rach-ConfigCommon is defined as a configuration of cell specific random access parameters which the WTRU uses for contention based and contention free random access as well as for contention based beam failure recovery in this BWP. The network configures SSB-based RA (and hence RACH-ConfigCommon) only for UL BWPs if the linked DL BWPs (same bwp-Id as UL-BWP) are the initial DL BWPs or DL BWPs containing the SSB associated to the initial DL BWP. The network configures rach-ConfigCommon, whenever it configures contention free random access (for reconfiguration with sync or for beam failure recovery).

ssb-perRACH-OccasionAndCB-PreamblesPerSSB is defined herein. The meaning of this field is twofold: the CHOICE conveys the information about the number of SSBs per RACH occasion. Value oneEighth corresponds to one SSB associated with 8 RACH occasions, value oneFourth corresponds to one SSB associated with 4 RACH occasions, and so on. The ENUMERATED part indicates the number of contention based preambles per SSB. Value n4 corresponds to 4 contention based preambles per SSB, value n8 corresponds to 8 contention based preambles per SSB, and so on. The total number of CB preambles in a RACH occasion is given by CB-preambles-per-SSB*max(1, SSB-per-rach-occasion).

totalNumberOfRA-Preambles is the total number of preambles used for contention based and contention free 4-step or 2-step random access in the RACH resources defined in RACH-ConfigCommon, excluding preambles used for other purposes (e.g. for SI request). If the field is absent, all 64 preambles are available for RA. The setting should be consistent with the setting of ssb-perRACH-OccasionAndCB-PreamblesPerSSB, i.e. it should be a multiple of the number of SSBs per RACH occasion.

For contention free random access such as during handover, RACH configuration can be provided via dedicated RRC signaling, as shown in FIG. 5, 510.

The NR random-access procedure may consist of four steps: step 1: uplink preamble/PRACH transmission; step 2: downlink random-access response (RAR or referred to as message-2) over PDSCH to indicate the reception of the preamble and provide a timing alignment command and a scheduling grant for message-3; step 3: uplink message-3 transmission over PUSCH, providing device identity to facilitate contention resolution; step 4: Downlink message-4 over PDSCH to resolve collision (i.e., contention resolution).

NR further supports a two-step RACH procedure. A benefit of two-step RACH, compared to four-step RACH, is a shorter random-access procedure enabling faster access. Two-step RACH includes: step A: uplink preamble/PRACH transmission together with a PUSCH data transmission, jointly referred to as message-A; step B: A single downlink transmission (referred to as message-B) over PDSCH indicating reception of message-A, providing timing alignment and resolving any collision that may have occurred in Step A.

There are two alternatives for the two-step RACH random access response, depending on whether or not the network is able to detect the decode message-A PUSCH transmission. If the network is able to decode message-A PUSCH transmission, it provides a Success RAR (including a timing alignment command, a C-RNTI, and a contention resolution identity). If the network detects the preamble transmission but is unable to correctly decode the message-A PUSCH, it may instead provide a Fallback RAR. The Fallback RAR contains the same information as the RAR of four-step RACH and indicates that the device should continue the random-access procedure as a four-step RACH. That is, with the uplink transmission of message 3 using the scheduling grant included in the Fallback RAR.

Figure 6A:
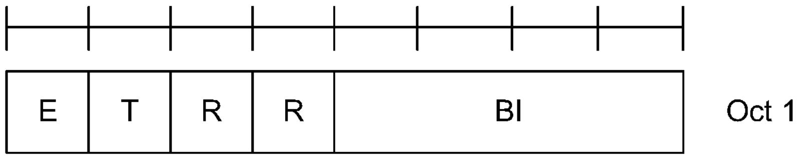
FIG. 6A shows an example MAC sub-header.
Figure 6B:
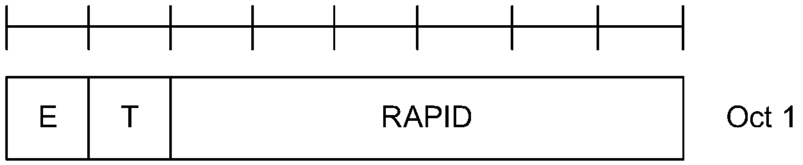
FIG. 6B shows an example MAC sub-header.

An RAR MAC PDU consists of one or more MAC subPDUs and optionally padding. Each MAC subPDU consists one of the following: a MAC subheader with Backoff Indicator only, as shown in FIG. 6A; a MAC subheader with RAPID only (i.e., acknowledgment for SI request) as shown in FIG. 6B; and_a MAC subheader with RAPID and MAC RAR.

The MAC subheader for RAR consists of the following fields:

E: The Extension field is a flag indicating if the MAC subPDU including this MAC subheader is the last MAC subPDU or not in the MAC PDU. The E field is set to 1 to indicate at least another MAC subPDU follows. The E field is set to 0 to indicate that the MAC subPDU including this MAC subheader is the last MAC subPDU in the MAC PDU;

T: The Type field is a flag indicating whether the MAC subheader contains a Random Access Preamble ID or a Backoff Indicator. The T field is set to 0 to indicate the presence of a Backoff Indicator field in the subheader (BI). The T field is set to 1 to indicate the presence of a Random Access Preamble ID field in the subheader (RAPID);

R: Reserved bit, set to 0;

BI: The Backoff Indicator field identifies the overload condition in the cell. The size of the BI field is 4 bits to represent 16 possible indices, with each index specifying a backoff time;

RAPID: The Random Access Preamble IDentifier field identifies the transmitted Random Access Preamble. The size of the RAPID field is 6 bits. If the RAPID in the MAC subheader of a MAC subPDU corresponds to one of the Random Access Preambles configured for SI request, MAC RAR is not included in the MAC subPDU.

Figure 6C:
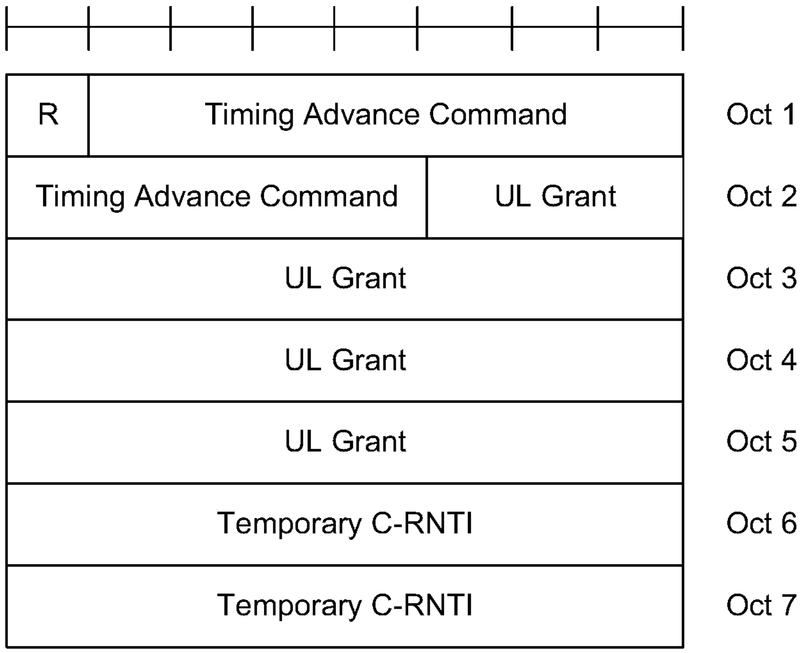
FIG. 6C shows an example MAC sub-header.

The MAC RAR, shown in FIG. 6C, is of fixed size and consists of the following fields:

R: Reserved bit, set to 0;

Timing Advance Command: The Timing Advance Command field indicates the index value TA used to control the amount of timing adjustment that the MAC entity has to apply. The size of the Timing Advance Command field is 12 bits;

UL Grant: The Uplink Grant field indicates the resources to be used on the uplink. The size of the UL Grant field is 27 bits;

Temporary C-RNTI: The Temporary C-RNTI field indicates the temporary identity that is used by the MAC entity during Random Access. The size of the Temporary C-RNTI field is 16 bits.

Figure 7:
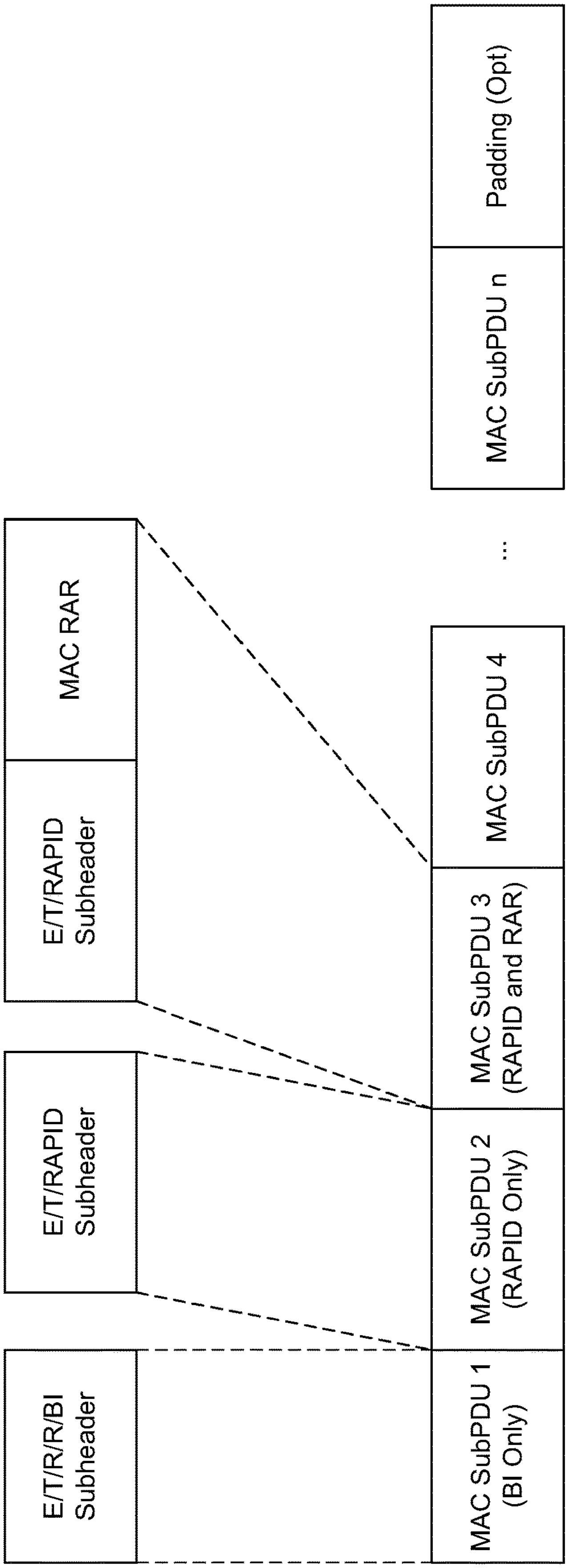
FIG. 7 shows example placements of MAC sub-PDUs.

'MAC subPDU(s) with RAPID only' and 'MAC subPDU(s) with RAPID and MAC RAR' can be placed anywhere between MAC subPDU with Backoff Indicator only (if any) and padding (if any). A MAC subheader with RAPID consists of three header fields E/T/RAPID. Padding is placed at the end of the MAC PDU if present. Presence and length of padding is implicit based on the transport block (TB) size, size of MAC subPDU(s). Example placements are shown in FIG. 7.

The basic procedure for Random Access Response (RAR) reception is summarized below:

If a valid downlink assignment has been received on the PDCCH for the RA-RNTI and the received TB is successfully decoded: if the Random Access Response contains a MAC subPDU with Backoff Indicator: set the PREAMBLE_ BACKOFF to a value of the BI field of the MAC subPDU multiplied with SCALING_FACTOR_BI. else: set the PREAMBLE_BACKOFF to 0 ms.

If the Random Access Response contains a MAC subPDU with Random Access Preamble identifier corresponding to the transmitted PREAMBLE_INDEX: consider this Random Access Response reception successful. If the Random Access Response reception is considered successful: if the Random Access Response includes a MAC subPDU with RAPID only: consider this Random Access procedure successfully completed; indicate the reception of an acknowledgement for SI request to upper layers. Else: apply the following actions for the Serving Cell where the Random Access Preamble was transmitted: process the received Timing Advance Command; indicate the preambleReceivedTargetPower and the amount of power ramping applied to the latest Random Access Preamble transmission to lower layers; and process the received UL grant value and indicate it to the lower layers.

If ra-ResponseWindow configured in RACH-ConfigCommon expires, and if the Random Access Response containing Random Access Preamble identifiers that matches the transmitted PREAMBLE_INDEX has not been received: consider the Random Access Response reception not successful; increment PREAMBLE_TRANSMISSION_COUNTER by 1; if PREAMBLE_TRANSMISSION_COUNTER=preambleTransMax+1:indicate a Random Access problem to upper layers; if the Random Access procedure is not completed: select a random backoff time according to a uniform distribution between 0 and the PREAMBLE_BACKOFF; perform the Random Access Resource selection procedure after the backoff time.

Preamble power control is described herein as follows. A WTRU may determine a transmission power for a physical random access channel (PRACH), $P_{PRACH,\ b,f,c}(i)$, on active UL BWP b of carrier f of serving cell C based on DL RS for serving cell C in transmission occasion i as $$P_{PRACH,b,f,c}(i)=\min\{P_{CMAX,f,c}(i),P_{PRACH,target,f,c}+PL_{b,f,c}\}\ [\text{dBm}],$$

Where $P_{CMAX,\ f,c}$ (i) is the WTRU configured maximum output power for carrier f of serving cell C within transmission occasion i, $P_{PRACH,\ target,\ f,c}$ is the PRACH target reception power PREAMBLE_RECEIVED_TARGET_POWER provided by higher layers for the active UL BWP b of carrier f of serving cell C, and $PL_{b,f,c}$ is a pathloss for the active UL BWP b of carrier f based on the DL RS associated with the PRACH transmission on the active DL BWP of serving cell C and calculated by the WTRU in dB as referenceSignalPower—higher layer filtered RSRP in dBm. If the active DL BWP is the initial DL BWP and for SS/PBCH block and CORESET multiplexing pattern 2 or 3, the WTRU determines $PL_{b,f,c}$ based on the SS/PBCH block associated with the PRACH transmission.

If a PRACH transmission from a WTRU is not in response to a detection of a PDCCH order by the WTRU, or is in response to a detection of a PDCCH order by the WTRU that triggers a contention based random access procedure, or is associated with a link recovery procedure where a corresponding index $q_{new}$ is associated with a SS/PBCH block, referenceSignalPower is provided by ss-PBCH-BlockPower.

If a PRACH transmission from a WTRU is in response to a detection of a PDCCH order by the WTRU that triggers a contention-free random access procedure and depending on the DL RS that the DM-RS of the PDCCH order is quasi-collocated with, referenceSignalPower is provided by ss-PBCH-BlockPower, or, if the WTRU is configured for resources for a periodic CSI-RS reception or the PRACH transmission is associated with a link recovery procedure where a corresponding index $q_{new}$ is associated with a periodic CSI-RS configuration, referenceSignalPower is obtained by ss-PBCH-BlockPower and powerControlOffsetSS where powerControlOffsetSS provides an offset of CSI-RS transmission power relative to SS/PBCH block transmission power. If powerControlOffsetSS is not provided to the WTRU, the WTRU assumes an offset of 0 dB. If the active TCI state for the PDCCH that provides the PDCCH order includes two RS, the WTRU expects that one RS is configured with qcl-Type set to 'typeD' and the WTRU uses the one RS when applying a value provided by powerControlOffsetSS.

If within a random access response window, the WTRU does not receive a random access response that contains a preamble identifier corresponding to the preamble sequence transmitted by the WTRU, the WTRU determines a transmission power for a subsequent PRACH transmission, if any, as follows: set PREAMBLE_POWER_RAMPING_STEP to powerRampingStep; set preambleTransMax to preambleTransMax included in the RACH-ConfigGeneric.

With reference to FIG. 8, configuration 810, preambleReceivedTargetPower may be defined as the target power level at the network receiver side. Only multiples of 2 dBm may be chosen (e.g., −202, −200, −198, . . . ). powerRampingStep may be defined as power ramping steps for PRACH. preambleTransMax may be defined as a maximum number of RA preamble transmission performed before declaring a failure.

Embodiments are described herein to ensure robust and efficient RACH preamble transmission and reception when coexisting with RADARs: These include: methods for RADAR coexistence using dynamic reconfiguration of the RACH configuration; methods for RADAR coexistence using multiple simultaneous RACH configurations; and methods for RADAR coexistence using RACH preamble power boosting. Although the embodiments described herein are contemplated for coexistence with a RADAR, they may also be applied for scenarios where coexistence with any type of wireless network is considered.

Methods for RADAR coexistence using dynamic reconfiguration of the RACH configuration are described herein. The process may be triggered by narrowband high-power interference level that passes a predefined threshold. In embodiments, the narrowband high-power interferer (e.g., RADAR) event triggering process can be achieved by either an external node that is independently determining RADAR characteristics such as interference level, range, AoA or by observing the cellular domain protocol stack measurements that are provided by WTRUs or determined by the network nodes (i.e., gNBs). The independent node is assumed to have synchronization with the network (i.e., gNB(s)).

Once the RADAR presence is detected, the network may create a new RACH configuration that is in the carrier spectrum in a chosen frequency location (via msg1-FrequencyStart and msg1-FDM in the RACH-ConfigGeneric IE) within the initial UL BWP (with possibly updated values of locationAndBandwidth in the genericParameters of inifialUpfinkBWP, if the frequency range of the new RACH configuration lies beyond the frequency range of the existing initial UL BWP) that the RADAR interference may not affect the RACH preamble reception processing from the emerging WTRUs for initial random-access procedures. The WTRUs already attached to the network may perform contention free RACH procedures by using the new RACH configuration as well. FIG. 9, 910 is an exemplary configuration.

Figure 10:
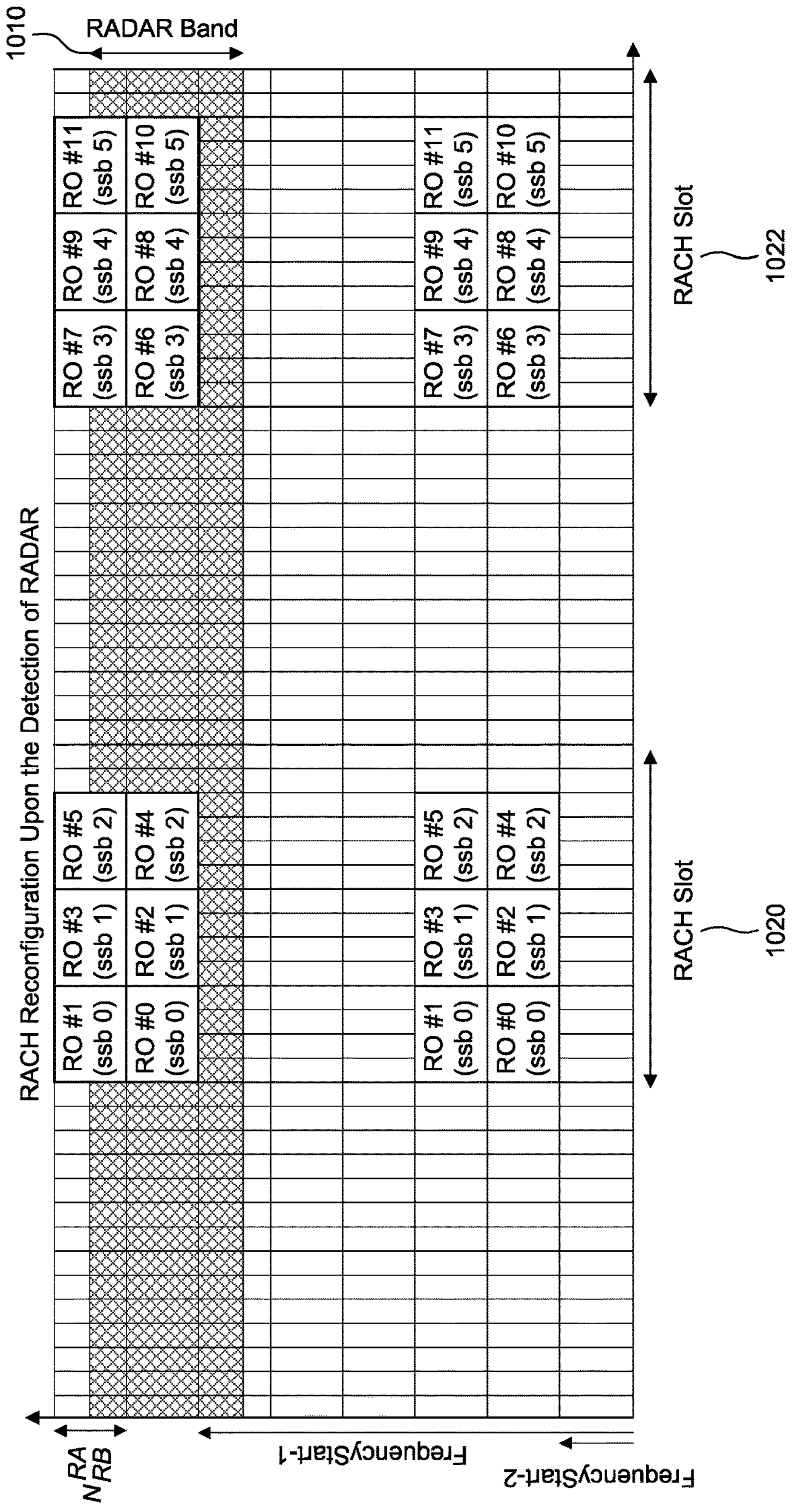
FIG. 10 shows an example resource allocation for RACH with RADAR interference.
Figure 11:
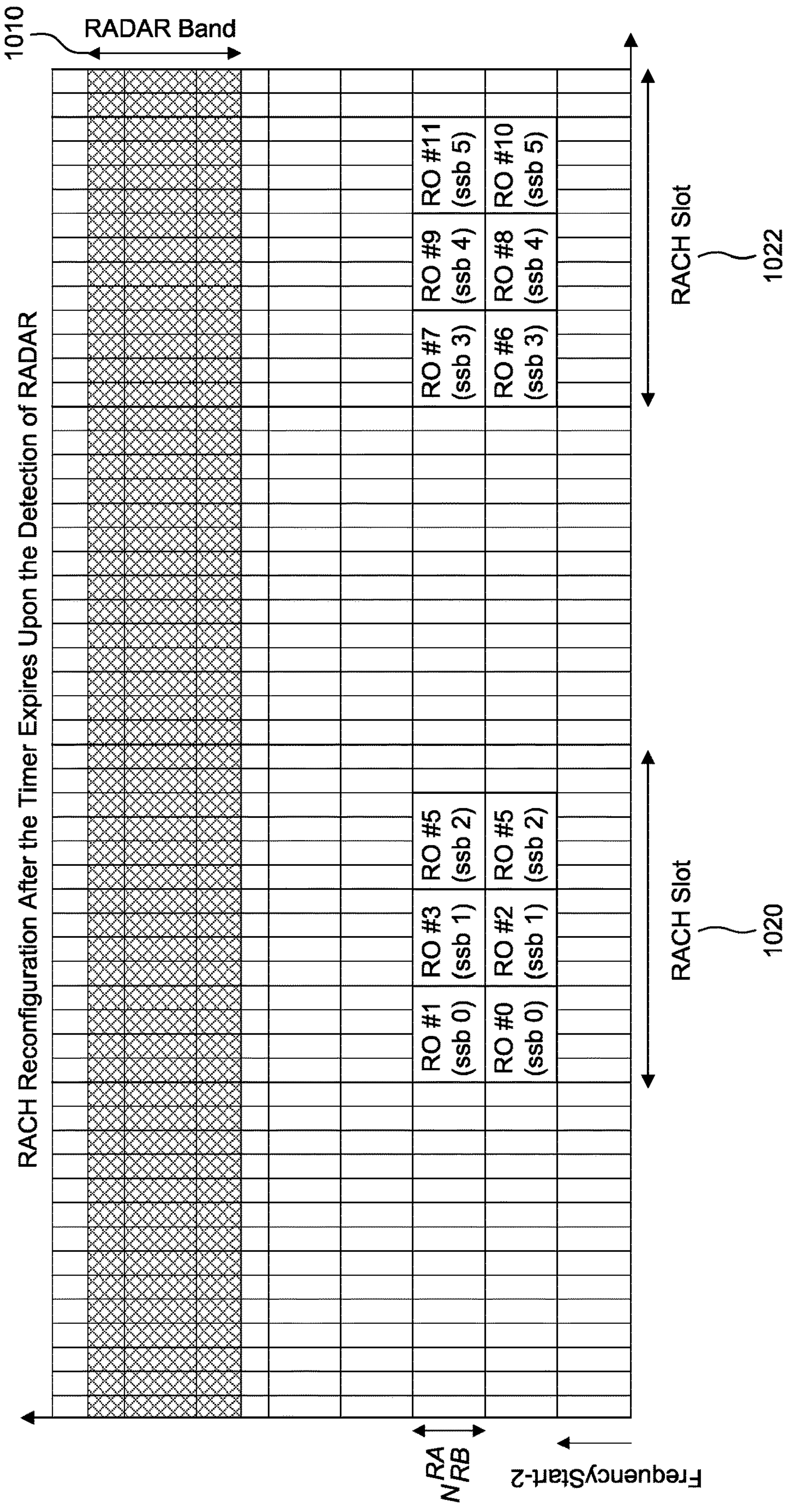
FIG. 11 shows a further example resource allocation for RACH with RADAR interference.

Upon the triggering of RADAR presence indication the network is informed with the RADAR parameters such as carrier location, interference bandwidth, AoA, PSD. Then, the network makes an assessment by comparing the RADAR carrier and bandwidth to the existing RACH configuration frequency domain location; if the network decides that the RADAR interference may disrupt the RACH preamble transmission/reception, it creates a timer and configures a new RACH configuration frequency location away from the RADAR interference in the carrier band, and updates the SIB 1 message accordingly. In addition, an overlap-timer may be chosen such that the old RACH configuration stays long enough so that the camped WTRUs that only know the interference affected RACH configuration frequency location have a chance to receive the system information modification via paging and read the updated SIB1 at least once. In the case of RRC connected WTRUs, the network can also send RRC reconfiguration messages to provide the new RACH configuration information. As shown in FIG. 10, wherein RADAR interference 1010 is experienced is a first frequency band, during the transition period both RACH configurations, the old and the new one, coexist, in RACH slots 1020, 1022 until the overlap-timer expires, as exemplified in FIG. 11.

In embodiments, to support RACH frequency relocation, one of the R bits in the RAR MAC PDU may be defined as an Obsolete RACH configuration Indicator (ORI) bit to indicate RACH configuration status change with corresponding RACH configuration update in SIB1. For example, in embodiments, the MAC sub-header for BI only MAC subPDUs can be redefined as E/T/R/ORI/BI for the 4-step RACH RAR and E/T1/T2/ORI/BI for the 2-step RACH Fallback RAR. The ORI field may be set to “0” to indicate normal operation. The ORI field may be set to “1” to indicate the WTRU needs to read SIB1 to retrieve the latest RACH configuration information. In addition, the RAR may also include a new ‘ulBWP’ MAC subPDU to directly indicate the updated initial UL BWP information (e.g., locationAndBandwidth) and the updated RACH configuration information (e.g., msg1-FrequencyStart) as well as a possibly updated cell defining SSB frequency location (e.g., using the ARFCN value) in a new ‘cdSSB’ MAC subPDU.

Figure 12:
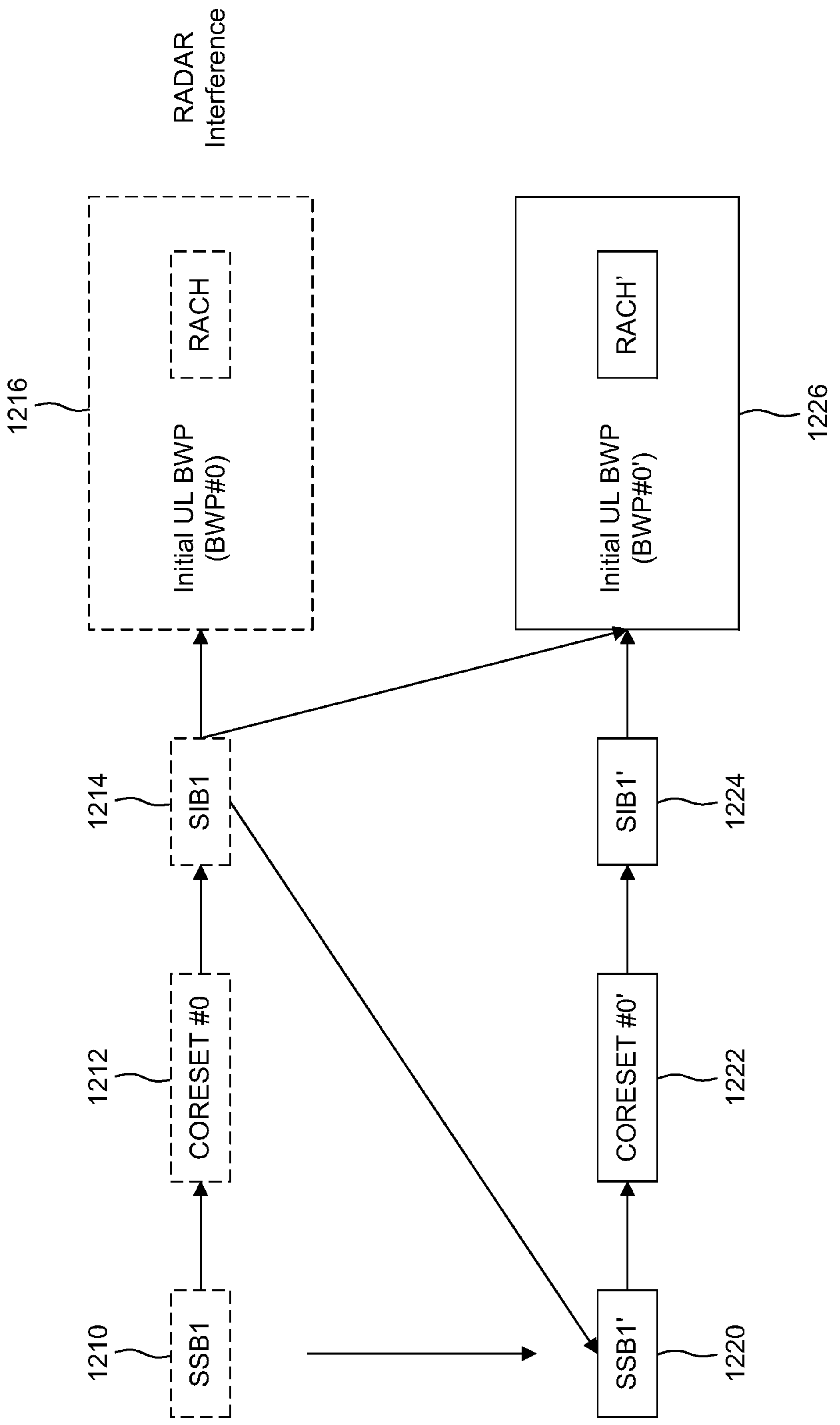
FIG. 12 is a diagram showing change of SSB/CORESET #0and RACH configuration frequencies due to RADAR interference.

The following description is with respect to FIG. 12. If any WTRU attempts to access the network via the old RACH configuration 1216 when the timer is still running, the network may use the random-access response (RAR) to inform the WTRU regarding the SIB1 system information (SI) update. The network may include BI only MAC subPDUs in the RAR/Fallback RAR with ORI bit set to 1 to indicate RACH configuration status change with corresponding SI update. In addition, the network may include the updated initial UL BWP and RACH configuration information 1226, and possibly the updated SSB frequency location in the RAR. Upon receiving the obsolete RACH configuration indication in RAR, the WTRU can also retrieve the updated initial UL BWP and RACH configuration information, and possibly the updated SSB 1220 frequency location from the RAR, if provided. Otherwise, WTRU should read the latest SIB1 information 1214 to extract the updated system information including initial UL BWP and RACH configuration information 1226. The latest SIB1 1214 may also include an updated SSB location 1220, if SSB/CORESET #0 1210/1212 frequency location has also been changed (to SSB/CORESET #0’ 1220/1222) due to the presence of RADAR interference, as illustrated in FIG. 12. Note that in the case of FDD, there is no need to relocate SSB if the RADAR interference is only impacting the UL frequency band.

On the WTRU side, if a valid downlink assignment has been received on the PDCCH for the RA-RNTI and the received TB is successfully decoded with ORI bit set to 1, and if the network includes the RAR MAC subPDU information in the RAR, the WTRU may continue with the random-access procedure accordingly. If the random-access procedure cannot be completed at any stage of the random-access procedure, WTRU may use the updated RACH configuration to restart random access. On the other hand, if the network does not include RAR MAC subPDU information in the RAR, the WTRU may stop the random-access attempt on the current RACH configuration immediately and uses the updated RACH configuration to restart random access, if the random-access procedure has not been successfully completed based on the reception of this RAR.

In embodiments, if the old SIB1 provides updated SSB information and the WTRU can obtain the updated RACH configuration from the new SIB1 via the updated SSB, the benefit of providing an updated initial UL BWP and RACH configuration information also from the old SIB1 is that the WTRU can start random access as soon as the WTRU acquires the new CORESET #0 information, instead of having to wait to read the new SIB1.

The modified RAR (in the case of four-step RACH) and the modified Fallback RAR (in the case of two-step RACH) are applicable for both contention based random-access (CBRA) for initial access and contention free random-access (CFRA) for handover, beam failure recovery, and SI request of non-broadcast system information.

THE WTRU should inform the network of its capability to support obsolete RACH configuration indication in the RAR, an embodiment of which is shown in the exemplary message in Table 7.

TABLE 7

| Definitions for parameters | Per | M | FDD – TDD DIFF | FR1 – FR2 DIFF |
|---|---|---|---|---|
| obsoleteRachIndication Indicates whether the WTRU supports obsolete RACH configuration indication in the RAR. | WTRU | No | No | No |

In embodiments, an external node to the network can determine interferer (such as RADAR) characteristics such as carrier frequency, bandwidth, periodicity, dwell time, AoA, and PSD. These measurements can also be determined within the wireless network by observing the measurements relevant to both WTRUs and the gNBs.

In embodiments, the PSD level passing a predefined threshold triggers an event. Upon the event triggering, the network determines the new RACH configuration location in frequency and changes the SIB1 RACH-ConfigGeneric parameter msg1-FrequencyStart. The network informs the WTRU with respect to the new RACH configuration frequency location via SI modification in paging short message for inactive/idle WTRUs and RRC reconfiguration for connected WTRUs. The network may support both RACH configurations for the transient time so that the WTRUs have a chance to learn about the new RACH configuration frequency location before the original RACH configuration frequency location is removed altogether.

If a WTRU attempts to perform random access using the old RACH configuration when the timer is still running, the network can use an enhanced RAR that includes an obsolete RACH configuration indicator (ORI) to notify the WTRU of the RACH configuration status change and that SIB1 contains updated RACH configuration information. In addition, the network can include updated initial UL BWP and RACH configuration information, and possibly updated SSB frequency location in the RAR. If a WTRU receives an enhanced RAR with the ORI bit set to 1, the WTRU can retrieve the updated initial UL BWP and RACH configuration information, and possibly the updated SSB frequency location from the RAR, if provided. Otherwise, the WTRU can read the SIB1 to retrieve the updated system information. If the network includes the RAR MAC subPDU information in the RAR, the WTRU may continue with the random-access procedure accordingly. If the random-access procedure cannot be completed at any stage of the random-access procedure, the WTRU can use the updated RACH configuration to restart random access. If the network does not include RAR MAC subPDU information in the RAR, the WTRU may stop the random-access attempt on the current RACH configuration immediately and use the updated RACH configuration to restart random access, if the random-access procedure has not been successfully completed based on the reception of this RAR.

Methods for RADAR coexistence using simultaneous RACH configurations are described herein.

The RACH configuration is very important for the emerging WTRUs to access the network as well as for already existing WTRUs in the network to perform handover, beam failure recovery, and SI requests, to name a few. Having only one RACH configuration may cause total system failure for both the emerging and already attached WTRUs if a high-power narrow band interferer such as RADAR overlaps in time and frequency domains with the RACH preamble transmissions.

Figure 13:
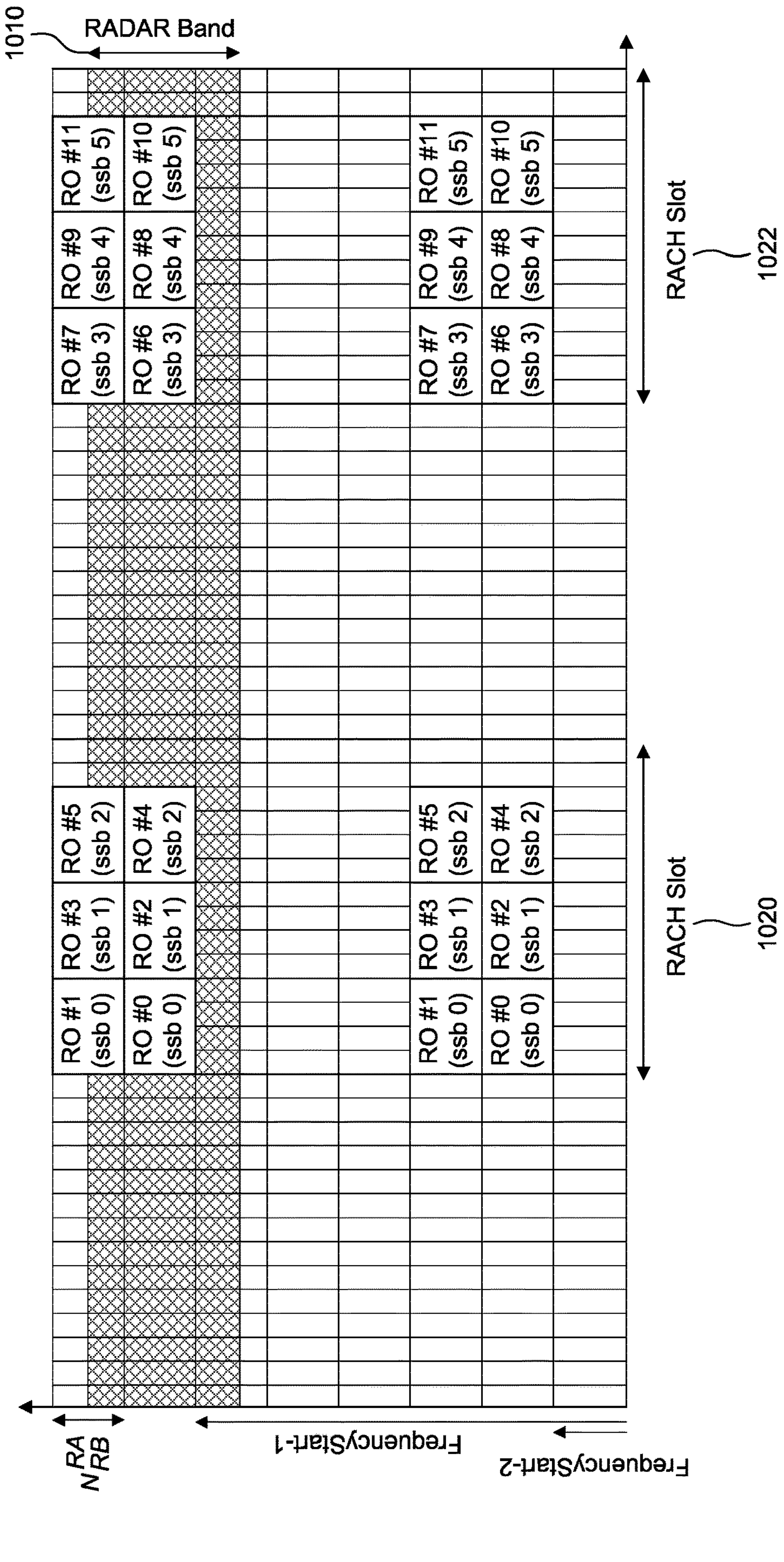
FIG. 13 shows a further example resource allocation for RACH with RADAR interference.

In embodiments, two or more simultaneous RACH configuration groups may be used to mitigate the impact of a RADAR interferer, as shown in FIG. 13, to guarantee initial access for the emerging WTRUs and retainability/mobility for the existing WTRUs in the network.

If an emerging WTRU gets into the system via SSB1 detection, and SSB1 related MIB and SIB1 reading, it can extract multiple the RACH configuration group frequency locations in the resource grid, as exemplified as msg1-FrequencyStart 1 and msg1-FrequencyStart 2 in FIG. 13. To this end, as shown in FIG. 14 in example configuration 1410, a rach-MultiConfigGeneric IE can be introduced in the RACH-ConfigCommon IE to include a msg1-OtherGroup-FrequencyStart parameter for the support of multiple RACH configuration groups. In addition, the mapping between cell-defining SSBs and RACH configuration groups can be provided by introducing rach-CdSsbIndex in the RACH-ConfigGeneric IE and rach-OtherGroupCdSsbIndex in the RACH-MultiConfigGeneric IE. The network needs to monitor the preambles on all RACH configuration groups. On the WTRU side, the WTRU may transmit preambles on any of the eligible RACH configuration groups, with the one indicated by the msg1-FrequencyStart as the default. Alternatively, the WTRU may transmit preambles in an alternate/hopping fashion or simultaneously among the eligible RACH configuration groups to combat frequency selective fading/interference. The alternation/hopping pattern (e.g., each time the PREAMBLE_BACKOFF timer expires) may be autonomously determined by the WTRU.

When two or more simultaneous RACH configuration groups are supported, the bandwidth of the initial UL bandwidth needs to be set large enough to accommodate all the RACH configuration groups. In this regard, a new multiRACHGenericParameters IE can be introduced in the BWP-UplinkCommon IE to define the locationAndBandwidth associated with multiple simultaneous RACH configuration groups. An exemplary BWP-UplinkCommon configuration 1510 is shown in FIG. 15

WTRUs should inform the network of their capability to support multiple RACH configuration groups, as exemplified by the following information message in Table 8. WTRUs that do not support simultaneous RACH configuration groups can follow the existing rach-ConfigGeneric IE in RACH-ConfigCommon and genericParameters IE in BWP-UplinkCommon.

TABLE 8

| Definitions for parameters | Per | M | FDD − TDD DIFF | FR1 − FR2 DIFF |
|---|---|---|---|---|
| multipleRachConfigurationGroups Indicates whether the WTRU supports multiple RACH configuration groups | WTRU | No | No | No |

The system design can also define multiple simultaneous cell defining SSB transmissions along with multiple simultaneous RACH configuration groups. Once an emerging WTRU detects and decodes one of the cell defining SSBs, it extracts all necessary information relevant to other cell defining SSB locations and their system parameters. Multiple cell defining SSBs can be deployed such that if the narrowband interferer such as RADAR is present, at least one of the cell defining SSBs can be available to guarantee emerging WTRUs to perform initial access and existing WTRUs in the system to maintain connectivity.

Figure 16:
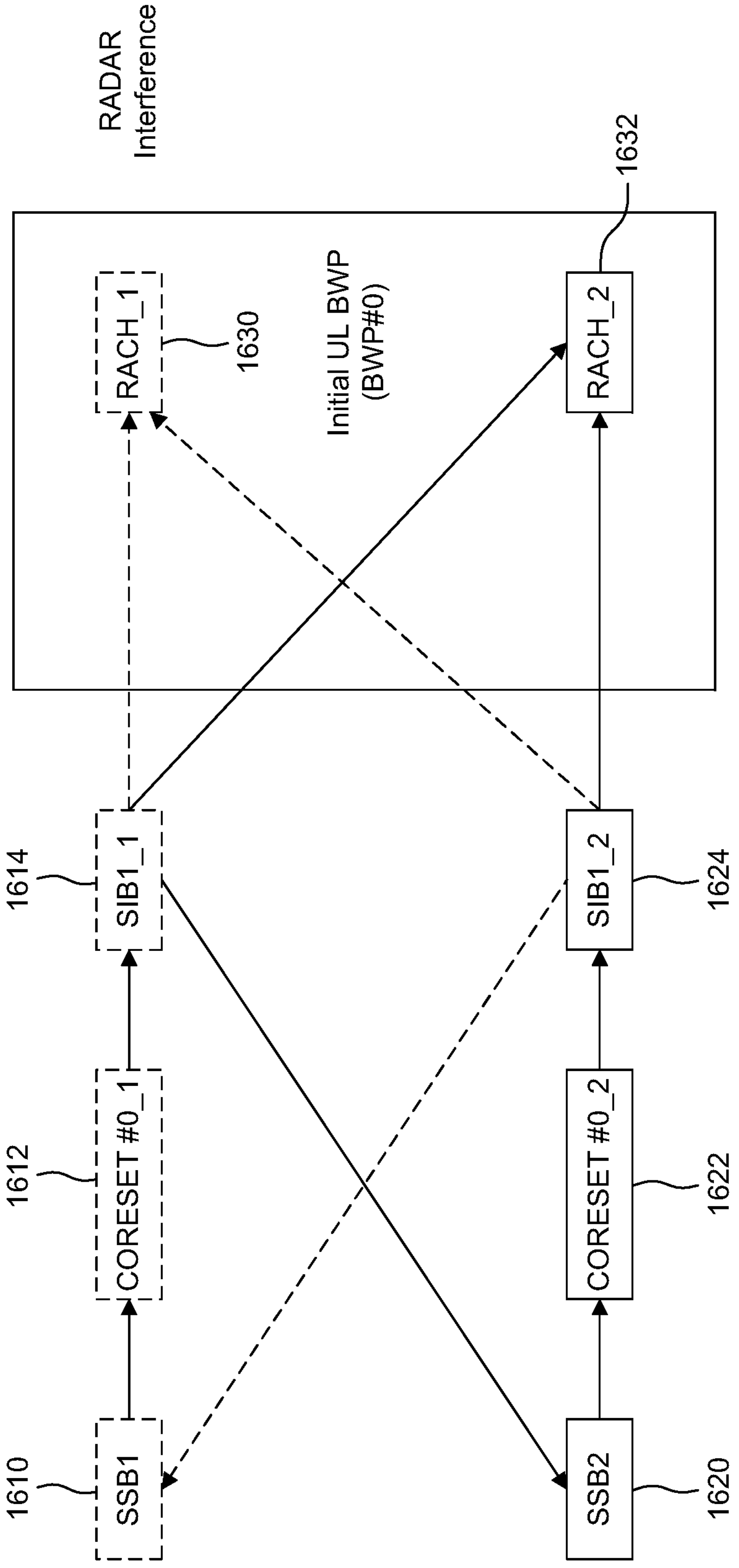
FIG. 16 is a diagram showing multiple RACH configuration groups linked to each of multiple SSBs.

To this end, in embodiments, upon the detection of RADAR interference, the network can update the available SSBs/CORESET #0s and RACH configuration groups in SIB1s based on the RADAR detection status. An example of this is shown in FIG. 16, showing multiple SSBs 1610,1620 with each SIB1 1614, 1624 links to multiple RACH configuration groups 1630, 1632 to mitigate RADAR interference, wherein the dashed line links originating from SIB1_1 1614 and SIB1_2 1624 would be removed upon the detection of RADAR interference over SSB1/CORESET #0_1 1612 and RACH_1 1630. In embodiments, the network may change the value of msg1-FrequencyStart to the value associated with one of the RACH configuration groups within msg1-OtherGroupFrequencyStart in the first SIB1_1 and remove the instance within msg1-OtherGroupFrequencyStart of the SIB1_2 that matches the original value of msg1-FrequencyStart associated with the first RACH configuration group. In addition, the network would remove the reference to the SSB1 frequency location within SIB1_2 1624. The network may then notify the idle/inactive WTRUs via the systemInfoModification bit in the paging short message. For enhanced robustness, the network can transmit paging short messages over all CORESET #0s and idle/inactive WTRUs may monitor paging alternately among the multiple CORESET #0s 1612, 1622 within a DRX cycle, or across DRX cycles, or a hybrid approach (e.g., partially within a DRX cycle and partially across DRX cycles).

If a camped WTRU attempts to perform random access over a suspended RACH configuration group before receiving the SI modification indication in the paging short message, the network can also use an ORI bit in the RAR, as described above regarding dynamic reconfiguration of the RACH configuration, to notify the WTRU to use a different RACH configuration group, as needed. In the case of RRC connected WTRUs, the network may also send RRC reconfiguration messages with the updated RACH configuration information. For a WTRU that is capable of supporting obsolete RACH configuration indication in the RAR (as described in Solution 1) as well as multiple RACH configuration groups, and if a valid downlink assignment has been received on the PDCCH for the RA-RNTI and the received TB is successfully decoded with ORI bit set to 1, and if the network includes the RAR MAC subPDU information in the RAR, the WTRU may continue with the random-access procedure accordingly. If the random-access procedure cannot be completed at any stage of the random-access procedure, the WTRU can use another available RACH configuration group in the stored SIB to restart random access. On the other hand, if the network does not include RAR MAC subPDU information in the RAR, the WTRU stops the random-access attempt on the current RACH configuration immediately and uses another available RACH configuration group in the stored SIB to restart random access, if the random-access procedure has not been successfully completed based on the reception of this RAR. The network can also include the msg1-OtherGroupFrequencyStartIndex (as illustrated in FIG. 14) in the RAR to indicate the recommended RACH configuration group and use the corresponding rach-OtherGroupCdSsbIndex (as illustrated in FIG. 14) to find the corresponding SSB in the stored SIB.

Figure 17:
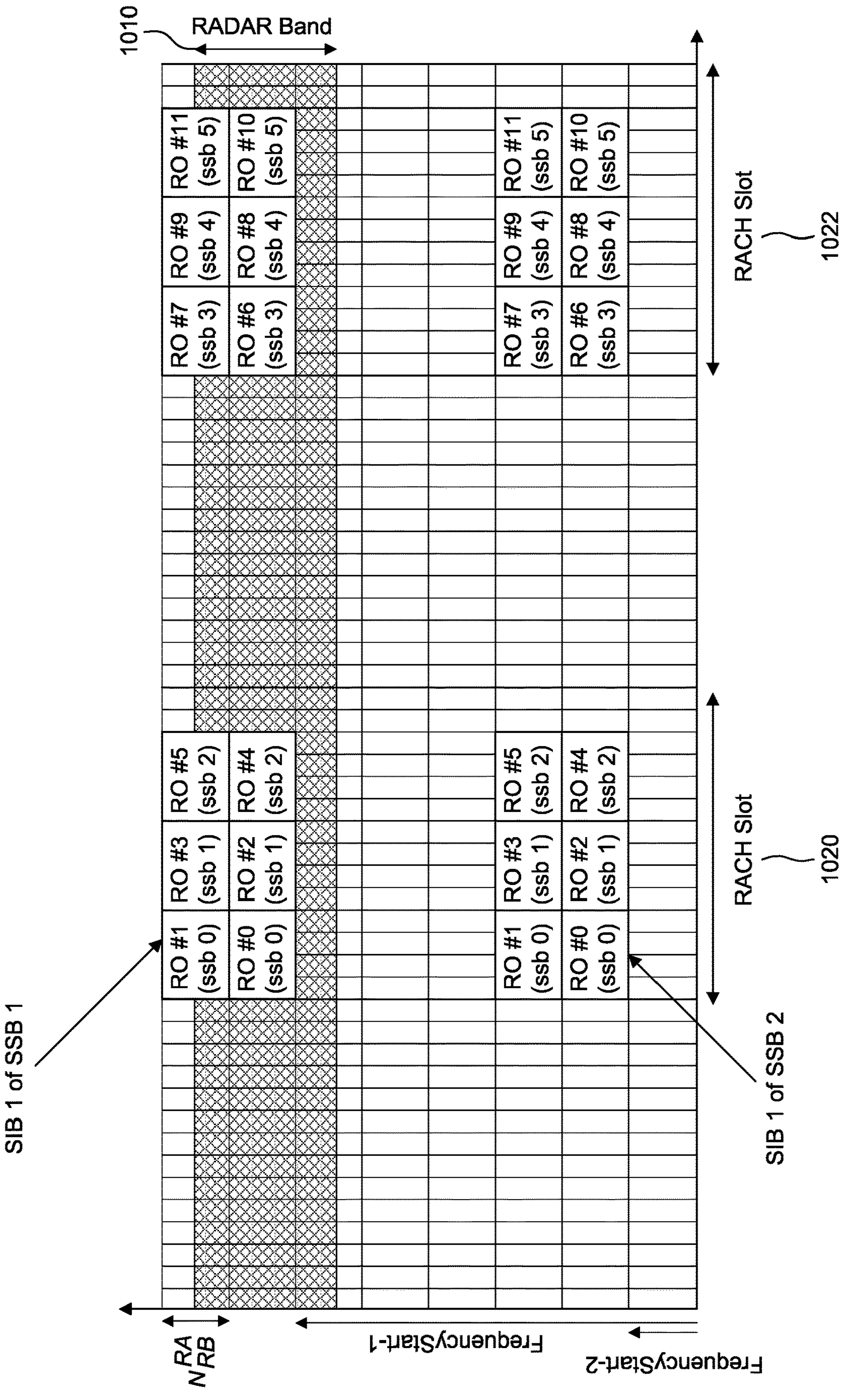
FIG. 17 shows a further example resource allocation for RACH with RADAR interference.

In the context of multiple cell defining SSBs, each SIB1 includes information for multiple or all RACH configuration groups. For example, in the case of two cell defining SSBs and two RACH configuration groups, SIB1 of SSB1 will provide the information of both msg1-FrequencyStart 1, and msg1-FrequencyStart 2, and so does SIB1 of SSB2, as illustrated in FIG. 17. Once an emerging WTRU detects and decodes one of the cell defining SSBs, it may extract RACH information associated with both SSB1 and SSB2 in addition to the other cell defining SSB frequency location. Note that herein "SSB" represents the SS Block burst set while "ssb" represents individual SS Block (and hence an individual SSB beam) within the SS Block burst set.

In the case of TDD, multiple simultaneous SSBs/CORESET #0s may be employed to enhance the system robustness against RADAR interference. Nominally, there should be a one-to-one mapping between the SSB/CORESET #0 and RACH configuration group within the simultaneous SSBs and RACH configurations as determined by the network. If a WTRU transmits preambles on one of the eligible RACH configurations, the network can use the corresponding CORESET #0 to transmit the RAR scheduling information and the WTRU will only need to monitor the same CORESET #0 the network uses to send the RAR scheduling information. Similarly, if a WTRU transmits preambles in an alternate/hopping fashion among the eligible RACH configurations, the WTRU needs to monitor the CORESET #0 corresponding to each hop for the reception of RAR.

Figure 18:
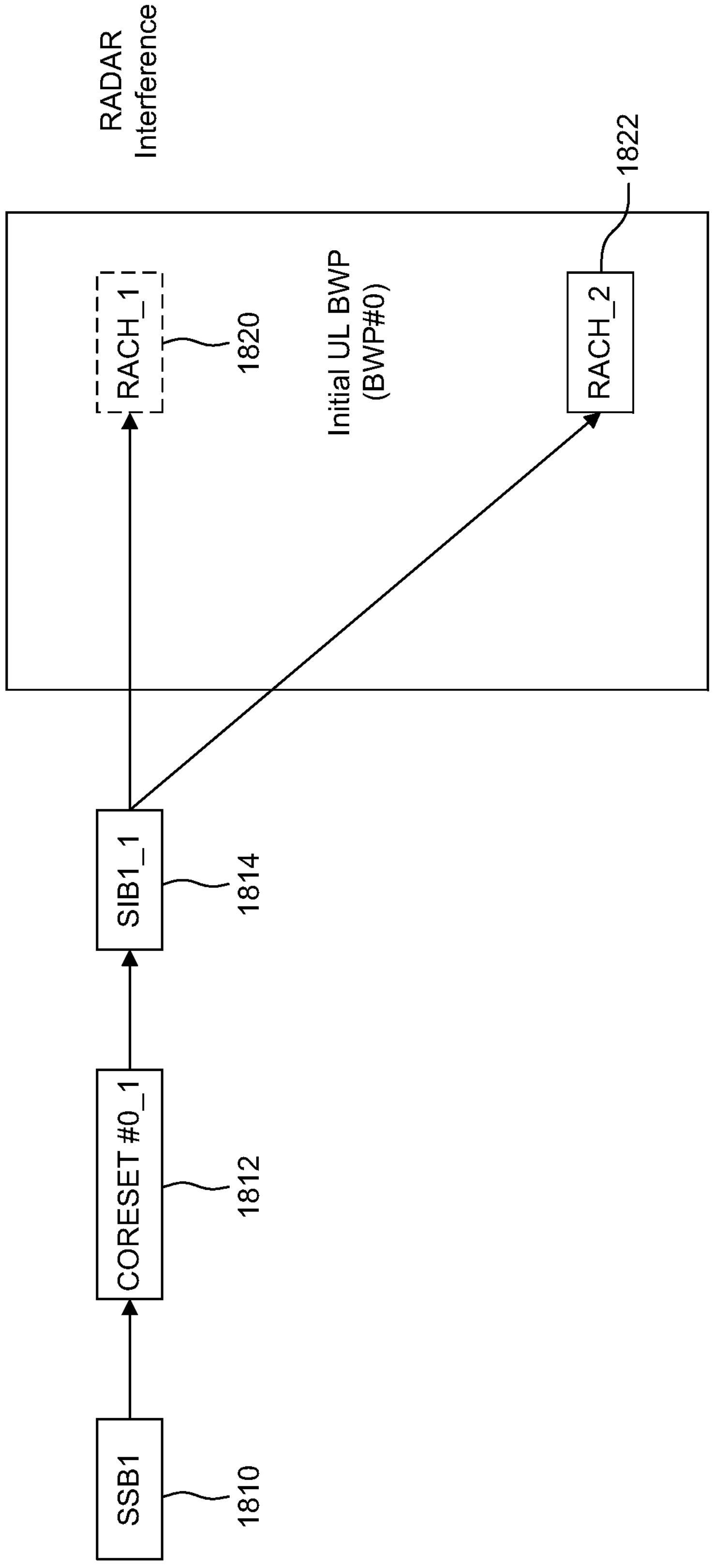
FIG. 18 is a diagram showing multiple RACH configuration groups linked to a single SSB.

In embodiments, multiple RACH configuration groups may be defined without deploying multiple simultaneous SSBs/CORSET #0s. For example, in the case of FDD, multiple simultaneous SSBs/CORSET #0s are not required if the RADAR interference only impacts the uplink band. In this case, the WTRU monitors the same CORESET #0 whether the WTRU transmits preambles on one of the eligible RACH configurations or more than one eligible RACH configuration with alternation/hopping, as illustrated in FIG. 18, which shows an SSB 1810 (CORESET #0, 1812, SIB1_1, 1814) with multiple RACH configuration groups 1820, 1822 mapping to mitigate RADAR interference on an FDD UL band.

Figure 19:
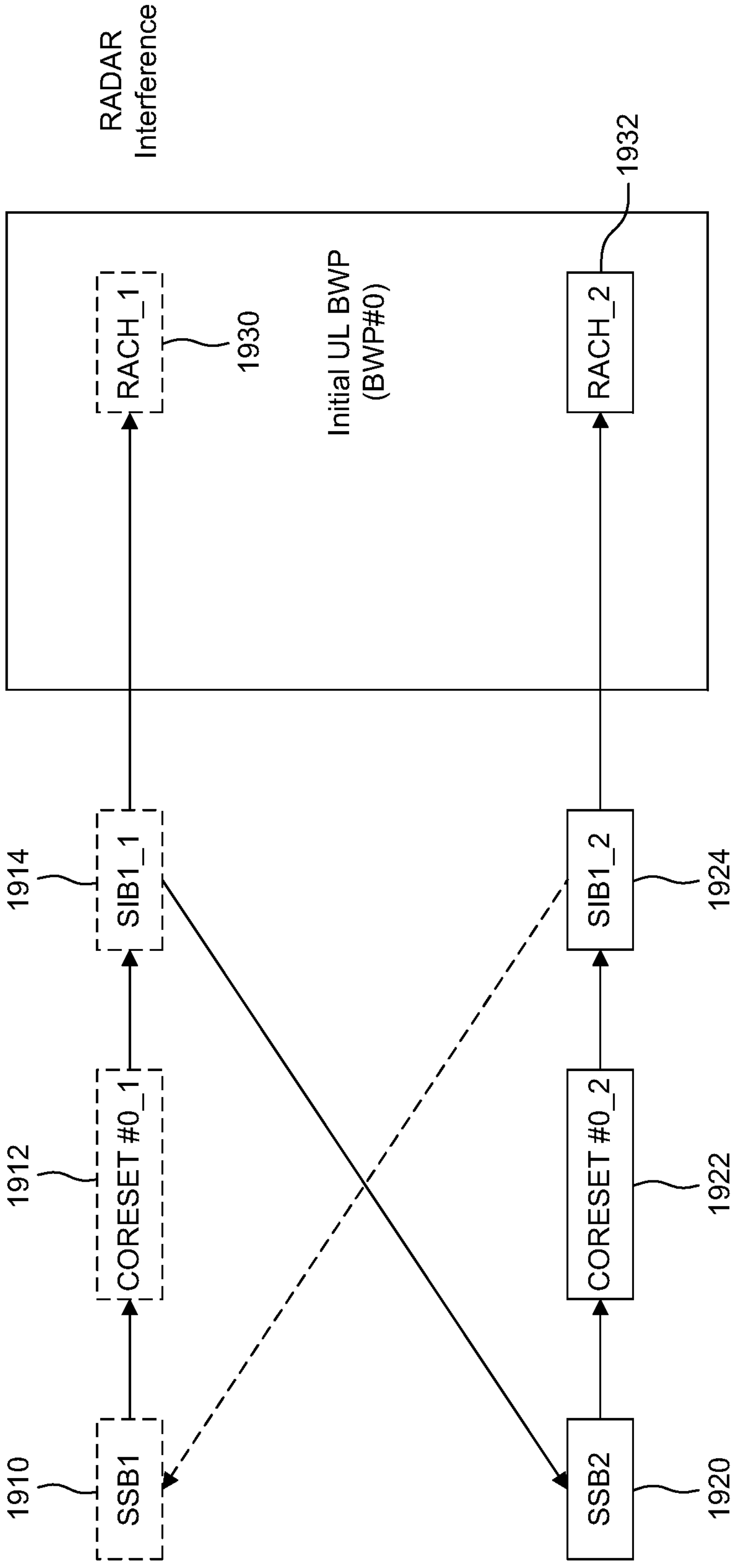
FIG. 19 is a further diagram showing multiple RACH configurations linked to multiple SSBs without cross referencing.

In another embodiment, illustrated in FIG. 19. once an emerging WTRU detects and decodes one of the cell defining SSBs, it extracts all necessary information relevant to other cell defining SSB locations and their system parameters. The SIB1 message of each cell defining SSB provides the information of its associated RACH configuration. For example, in the case of two simultaneous RACH configurations 1930, 1932, SIB 1 1914 of SSB1 1910 (CORESET #0_1) will provide the information of msg1-FrequencyStart 1, and SIB 1 1924 of SSB2 1920 (CORESET #0_2) will provide the information of msg1-FrequencyStart 2, respectively. In this embodiment, there is no need to introduce the parameter msg1-GroupFrequencyStart and associated rach- MultiConfigGeneric IE. The WTRU will need to retrieve the multiple RACH configurations separately from each SIB1.

Figure 20:
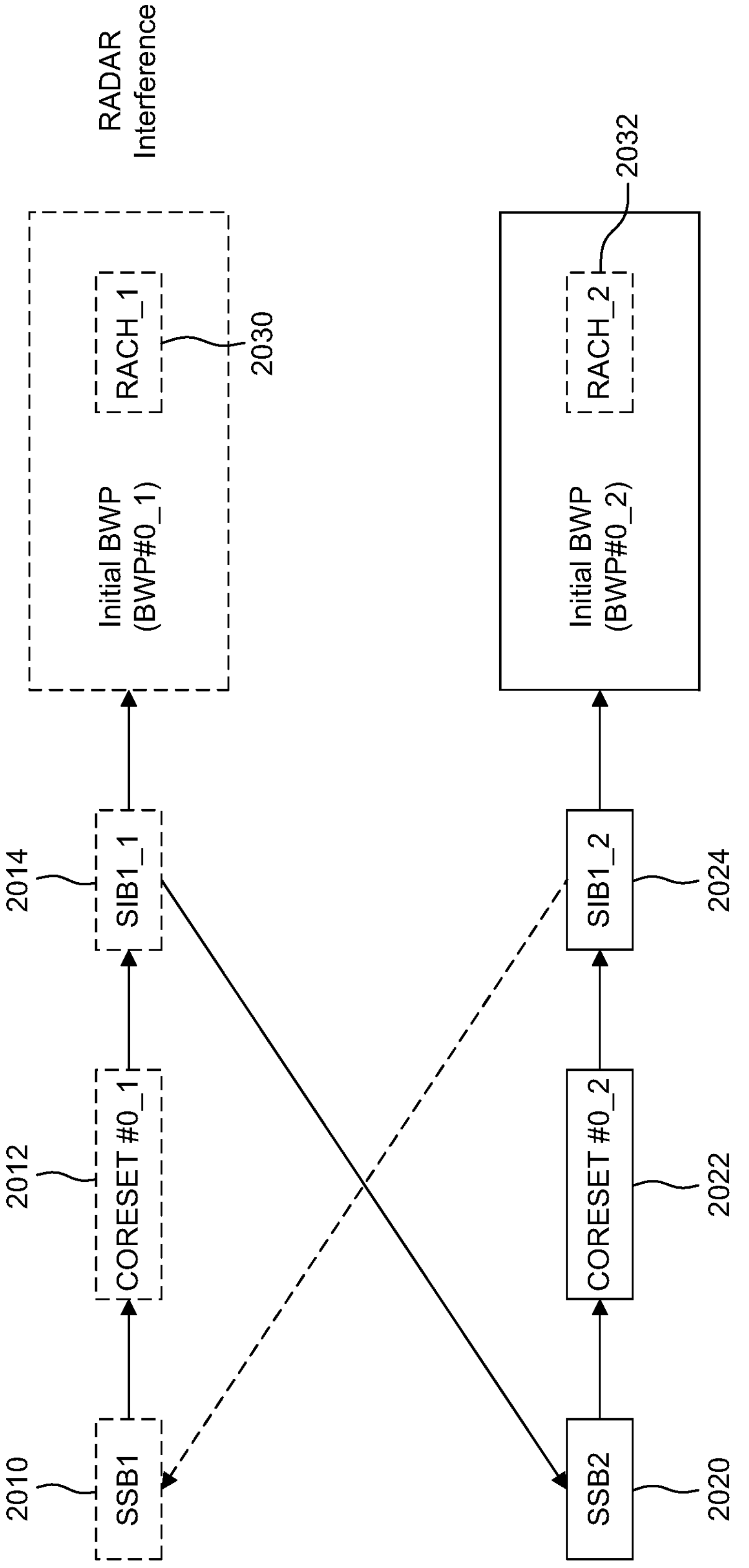
FIG. 20 is a diagram showing multiple uplink BWPs linked to multiple SSBs without cross referencing.
Figure 21:
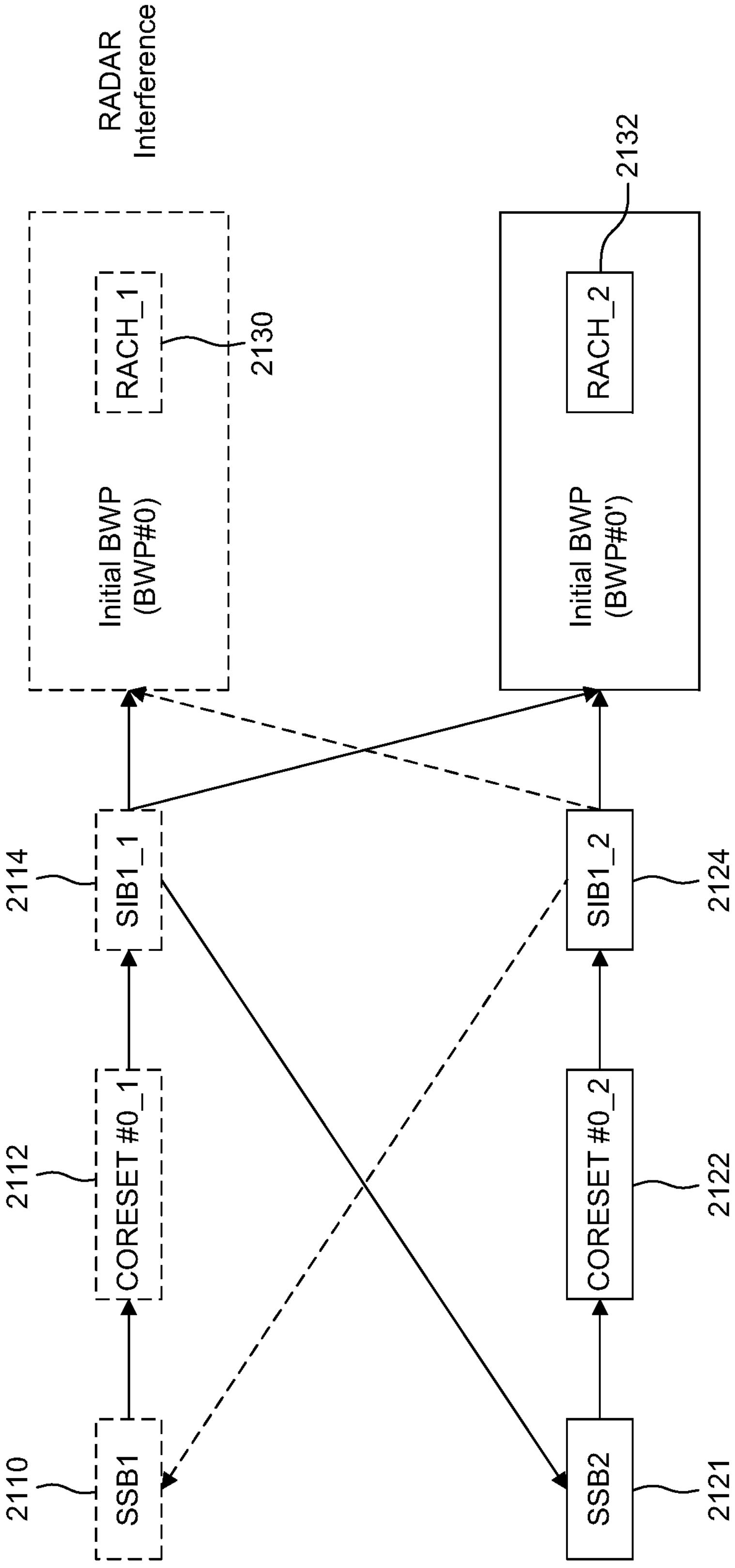
FIG. 21 is a further diagram showing multiple uplink BWPs linked to each of multiple SSBs.

In yet another embodiment, the system design may define multiple simultaneous initial UL BWPs to facilitate multiple RACH configurations in the presence of multiple cell defining SSB transmissions. Multiple initial UL BWPs can be deployed such that if the narrowband interferer such as RADAR is present, at least one of the initial UL BWP can be available to guarantee emerging WTRUs to perform initial access and existing WTRUs in the system to maintain connectivity. Each SIB1 can contain information with respect to either a single initial UL BWP (as illustrated in FIG. 20, showing SSB1, 2010, CORESET #0_1, 2012, SIB1_1, 2014, RACH_1 configuration 2030, SSB2, 2020, CORESET #0_2, 2022, SIB1_2, 2024 and RACH_2 configuration 2032) or multiple initial UL BWPs (as illustrated in FIG. 21, showing SSB1, 2110, CORESET #0_1, 2112, SIB1_1, 2114, RACH_1 configuration 2130, SSB2, 2120, CORESET #0_2, 2122, SIB1_2, 2124 and RACH_2 configuration 2132).

In embodiments, two or more RACH configuration frequency locations that are far apart in the carrier band may be allocated. This allows that if one of the RACH configurations is corrupted by a high-power narrowband interferer, the other one(s) is(are) not affected. Multiple simultaneous RACH configurations may be implemented by defining multiple RACH configuration groups in the initial UL BWP. Alternatively, multiple simultaneous RACH configurations may be implemented by defining multiple initial UL BWPs. In embodiments, the multiple RACH configurations may be associated with a single cell defining SSB or multiple simultaneous cell defining SSBs.

When multiple RACH configurations are available, a WTRU may perform random access via a RACH occasion in a single RACH configuration or RACH occasions from multiple RACH configurations in an alternate/hopping fashion or simultaneously. WTRU capability information may be provided to the network with respect to the support of multiple simultaneous RACHs.

Upon the detection of RADAR interference, the network informs the WTRU about the availability change of the RACH configuration resources via SI modification in paging short message for inactive/idle WTRUs and RRC reconfiguration for connected WTRUs. If a WTRU attempts to perform random access using a RADAR interference impacted RACH configuration, the network can use an enhanced RAR (by including an obsolete RACH configuration indicator, or ORI bit) to notify the WTRU that the current RACH configuration is not available. The network can also include the recommended alternative RACH configuration group and the corresponding SSB information in the RAR.

If a WTRU receives an enhanced RAR with the ORI bit set to 1, the WTRU may proceed to perform random access via other available RACH configuration resources if the random-access procedure has not been successfully completed based on the reception of this RAR.

RACH preamble power boosting is described herein. For PRACH preamble transmission, a WTRU may select the initial preamble transmit power based on estimates of the downlink pathloss in combination with a target received preamble power (preambleReceivedTargetPower) configured by the network. The pathloss should be estimated based on the received power of the SS/PBCH block that the device has acquired and from which it has determined the RACH resource to use for preamble transmission. If no random-access response is received within a predetermined window, the device can assume that the preamble was not correctly received by the network, most likely due to the fact that the preamble was transmitted with too low power. If this happens, the WTRU may repeat the preamble transmission with the preamble transmit power increased by a certain configurable offset (powerRampingStep). This power ramping continues until a random-access response has been received or until a configurable maximum number of retransmissions (preambleTransMax) has been carried out. In the latter case, the random-access attempt is declared as a failure.

Due to the high transmitting power of the RADAR signal, the interference from radar to the 5G system can be so strong that not only the RADAR signal within the radar bandwidth can interfere with the 5G system, but the RADAR signal outside of the radar bandwidth can also introduce significant interference to the 5G system, depending on the radar signal power spectral density (PSD) distribution. In this regard, the RADAR interference on the RACH preamble transmission may still be significant, even when the RADAR bandwidth does not overlap with RACH frequency resources, or after RACH reconfiguration out of the RADAR operating bandwidth when the RADAR bandwidth overlaps with RACH frequency resources. To this end, it would be useful to boost the RACH preamble transmission power to mitigate the RADAR interference on the received RACH preambles.

RACH preamble power boosting may be triggered when the RADAR interference exceeds a threshold. The threshold may be preconfigured, determined dynamically or provided by an external entity. The gNB or an external node to the network can determine the interferer characteristics such as carrier frequency, bandwidth, periodicity, dwell time, AoA, and PSD. The gNB may further use information characterizing the operation of the RADAR to determine the interference level. The gNB can increase the preambleReceivedTargetPower via the SIB1 message. For contention free random access, the gNB can increase the value of preambleReceivedTargetPower via dedicated RRC signaling.

In embodiments an external node to the network can determine the interferer characteristics such as carrier frequency, bandwidth, periodicity, dwell time, AoA, and PSD. These measurements can also be determined within the wireless network by observing the measurements relevant to both WTRUs and the gNBs. The PSD level passing a predefined threshold may trigger an event. Upon the event triggering, the network determines the new RACH configuration location in frequency and changes the SIB 1 RACH-ConfigGeneric parameter preambleReceivedTargetPower to improve the preamble detection probability with RADAR coexistence, even when the RADAR bandwidth does not overlap with operating or reconfigured RACH frequency resources in order to mitigate RADAR power spectral leakage.

Figure 22:
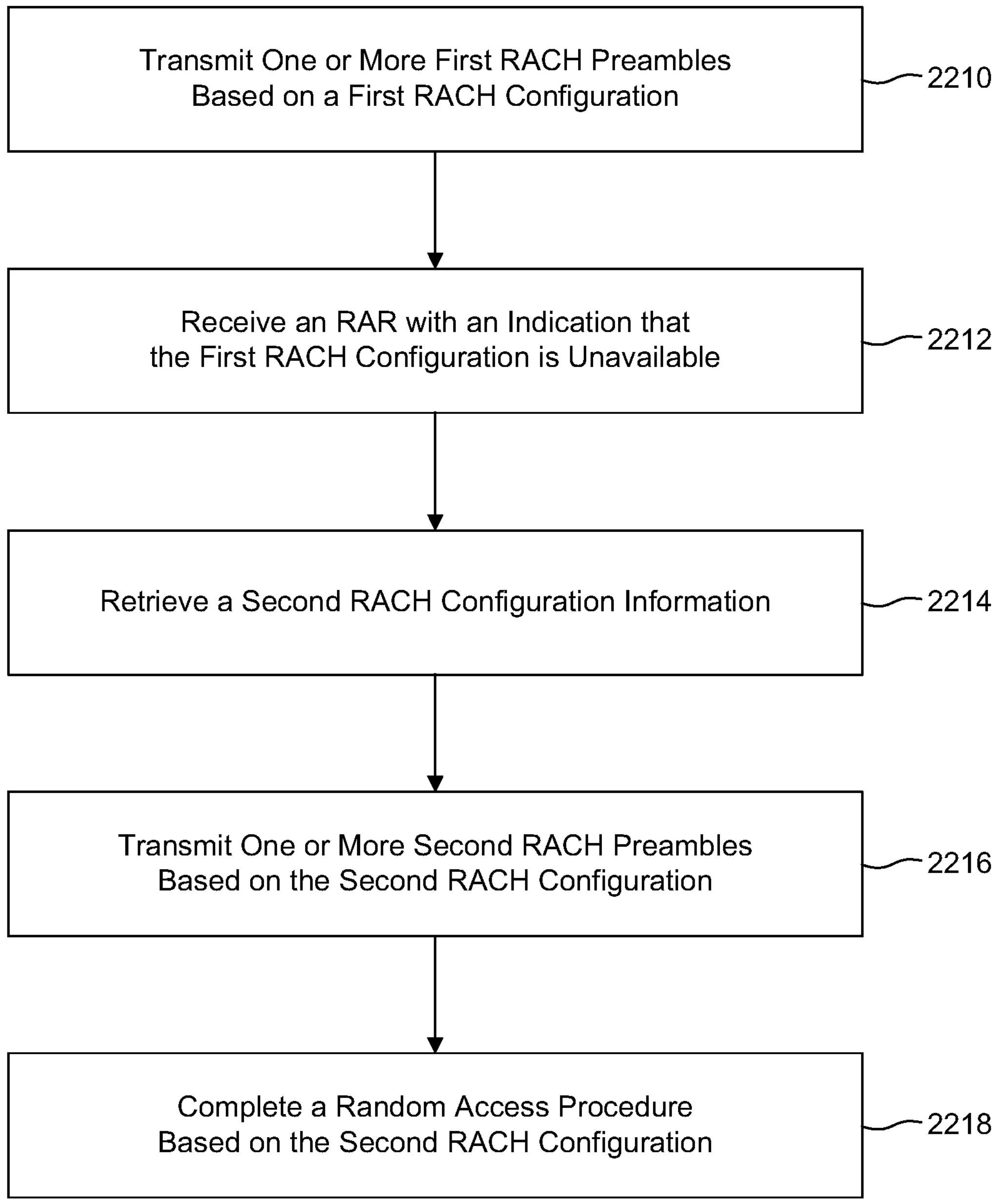
FIG. 22 is a flow diagram of an exemplary process implemented by a WTRU including multiple RACH configurations.

FIG. 22 describes an exemplary process implemented by a WTRU and including multiple RACH configurations, consistent with descriptions herein. At 2210, one or more first RACH preambles are transmitted based on a first RACH configuration. At 2212, the WTRU receives an RAR with an indication that the first RACH configuration is unavailable. At 2214 the WTRU retrieves a second RACH configuration information. At 2216, the WTRU transmits one or more second RACH preambles based on the second RACH configuration. At 2218 the WTRU completes a random access procedure based on the second RACH configuration. In embodiments, the process may further include wherein the second RACH configuration is retrieved from a stored SIB. In embodiments the process may further include wherein the second RACH configuration is retrieved from a most-recently received SIB message. In embodiments the process may further include wherein the second RACH configuration is retrieved from the RAR. In embodiments the process may further include wherein frequency domain resources of a RACH configuration are defined by a start frequency location and information related to the bandwidth, which may be defined by, for example, msg1-FrequencyStart and msg1-FDM. In embodiments the process may further include wherein the second RACH configuration, which may be defined by a different set of msg1-FrequencyStart and msg1-FDM, is desegregated from the first RACH configuration in the frequency domain. In embodiments the process may further include, wherein a second RACH configuration frequency location is included in the RAR.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method implemented by a wireless transmit/receive unit (WTRU) comprising:

transmitting one or more first random access channel (RACH) preambles based on a first RACH configuration;

receiving a random access response (RAR) with an indication that the first RACH configuration is unavailable, wherein the RAR incorporates (1) updated initial bandwidth part (BWP) information and (2) updated cell-defining synchronization frequency block (SSB) frequency location;

retrieving a second RACH configuration;

transmitting one or more second RACH preambles based on the second RACH configuration; and performing a random access procedure based on the second RACH configuration.

2. The method of claim 1, wherein the second RACH configuration is retrieved from a stored system information block (SIB).

3. The method of claim 1, wherein the second RACH configuration is retrieved from a most-recently received SIB message.

4. The method of claim 1, wherein the second RACH configuration is retrieved from the RAR.

5. The method of claim 1, wherein frequency domain resources of a RACH configuration are defined by a start frequency location and information related to a number of frequency-multiplexed RACH occasions.

6. The method of claim 1, wherein the second RACH configuration is separated from the first RACH configuration in the frequency domain.

7. The method of claim 1, wherein the (1) updated initial bandwidth part (BWP) information and (2) updated cell-defining synchronization frequency block (SSB) frequency location are transmitted in a Medium Access Control Protocol Data Unit (MAC PDU).

8. The method of claim 1, wherein the first RACH configuration and the second RACH configuration are both active for a predetermined period of time.

9. A wireless transmit receive unit (WTRU) comprising:

a transmitter;

a receiver; and a processor in communication with the transmitter and receiver, the processor and transmitter or receiver configured to:

transmit one or more first random access channel (RACH) preambles based on a first RACH configuration;

receive a random access response (RAR) with an indication that the first RACH configuration is unavailable, wherein the RAR incorporates (1) updated initial bandwidth part (BWP) information and (2) updated cell-defining synchronization frequency block (SSB) frequency location;

retrieve a second RACH configuration;

transmit one or more second RACH preambles based on the second RACH configuration; and perform a random access procedure based on the second RACH configuration.

10. The WTRU of claim 9, wherein the second RACH configuration is retrieved from a stored system information block (SIB).

11. The WTRU of claim 9, wherein the second RACH configuration is retrieved from a most-recently received SIB message.

12. The WTRU of claim 9, wherein the second RACH configuration is retrieved from the RAR.

13. The WTRU of claim 9, wherein frequency domain resources of a RACH configuration are defined by a start frequency location and information related to a number of frequency-multiplexed RACH occasions.

14. The WTRU of claim 9, wherein the second RACH configuration is separated from the first RACH configuration in the frequency domain.

15. The WTRU of claim 9, wherein the (1) updated initial bandwidth part (BWP) information and (2) updated cell-defining synchronization frequency block (SSB) frequency location are transmitted in a Medium Access Control Protocol Data Unit (MAC PDU).

16. The WTRU of claim 9, wherein the first RACH configuration and the second RACH configuration are both active for a predetermined period of time.

* * * * *